United States Patent
Sugita et al.

(10) Patent No.: US 9,870,111 B2
(45) Date of Patent: Jan. 16, 2018

(54) TOUCHSCREEN PANEL WITH DRIVING ELECTRODES CONNECTED TO A PLURALITY OF LEAD LINES EXTENDING IN PARALLEL TO SENSING ELECTRODES

(71) Applicant: Sharp Kabushiki Kaisha, Osaka-shi, Osaka (JP)

(72) Inventors: Yasuhiro Sugita, Osaka (JP); Hiroyuki Ogawa, Osaka (JP); Kenshi Tada, Osaka (JP); Yuuichi Kanbayashi, Osaka (JP); Shinji Yamagishi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/029,259

(22) PCT Filed: Aug. 22, 2014

(86) PCT No.: PCT/JP2014/072047
§ 371 (c)(1),
(2) Date: Apr. 14, 2016

(87) PCT Pub. No.: WO2015/056484
PCT Pub. Date: Apr. 23, 2015

(65) Prior Publication Data
US 2016/0253001 A1    Sep. 1, 2016

(30) Foreign Application Priority Data

Oct. 15, 2013 (JP) ................................ 2013-214912

(51) Int. Cl.
*G06F 3/041* (2006.01)
*G06F 3/044* (2006.01)
(Continued)

(52) U.S. Cl.
CPC .......... *G06F 3/044* (2013.01); *G02F 1/13338* (2013.01); *G06F 3/0416* (2013.01);
(Continued)

(58) Field of Classification Search
CPC ...... G06F 3/041; G06F 3/0412; G06F 3/0416; G06F 3/044; G06F 3/045; G06F 3/047
(Continued)

(56) References Cited

U.S. PATENT DOCUMENTS

| | | | |
|---|---|---|---|
| 6,452,514 B1 | 9/2002 | Philipp | |
| 2011/0001717 A1* | 1/2011 | Hayes | G06F 3/044 345/173 |

(Continued)

FOREIGN PATENT DOCUMENTS

| | | |
|---|---|---|
| JP | 2010-198615 A | 9/2010 |
| JP | 2012-118957 A | 6/2012 |

(Continued)

*Primary Examiner* — Alexander Eisen
*Assistant Examiner* — Nelson Lam
(74) *Attorney, Agent, or Firm* — Keating & Bennett, LLP

(57) ABSTRACT

A touchscreen panel according to an embodiment of the present invention includes a transparent substrate (101); a first electrically conductive layer (12) supported on the transparent substrate, the first electrically conductive layer including a plurality of sensing electrodes (12S) extending along a first direction; and a second electrically conductive layer (14) including a plurality of driving electrodes (14D) extending along a second direction intersecting the first direction, the plurality of driving electrodes being electrically insulated from the plurality of sensing electrodes. The plurality of sensing electrodes and the plurality of driving electrodes define a sensor array region (10A), the sensor array region including a plurality of sensor portions (10S) arranged in a matrix array. The first electrically conductive layer further includes a plurality of lead lines (12Dt) extending essentially in parallel to the first direction within the (Continued)

sensor array region. Each of the plurality of driving electrodes is connected to at least one of the plurality of lead lines, and terminals of the plurality of sensing electrodes and terminals of the plurality of lead lines are both provided in the neighborhood of the same edge of the transparent substrate that extends essentially in parallel to the second direction.

11 Claims, 30 Drawing Sheets

(51) Int. Cl.
*G02F 1/1333* (2006.01)
*G02F 1/1368* (2006.01)

(52) U.S. Cl.
CPC .......... *G02F 1/1368* (2013.01); *G06F 3/0418* (2013.01); *G06F 2203/04104* (2013.01); *G06F 2203/04112* (2013.01)

(58) Field of Classification Search
USPC ................................................ 345/173–179
See application file for complete search history.

(56) References Cited

U.S. PATENT DOCUMENTS

| | | |
|---|---|---|
| 2011/0310488 A1 | 12/2011 | Tomotoshi et al. |
| 2012/0049718 A1 | 3/2012 | Watanabe et al. |
| 2012/0182233 A1* | 7/2012 | Kim .................... G06F 3/044 345/173 |
| 2012/0313860 A1* | 12/2012 | Hashimura ............ B82Y 15/00 345/173 |
| 2012/0319974 A1* | 12/2012 | Kim .................... G06F 3/044 345/173 |
| 2013/0127752 A1* | 5/2013 | Takeuchi ............ G02F 1/13338 345/173 |
| 2013/0127779 A1* | 5/2013 | Lillie .................... G06F 3/0416 345/174 |
| 2013/0211757 A1 | 8/2013 | Miyamoto |
| 2015/0091842 A1* | 4/2015 | Shepelev ................ G06F 3/044 345/174 |
| 2015/0185937 A1* | 7/2015 | Lee ....................... G06F 3/0412 345/173 |
| 2017/0160845 A1* | 6/2017 | Lee ....................... G06F 3/0412 |

FOREIGN PATENT DOCUMENTS

| | | |
|---|---|---|
| WO | 2010/092794 A1 | 8/2010 |
| WO | 2010/122781 A1 | 10/2010 |

* cited by examiner

FIG.3
(a)
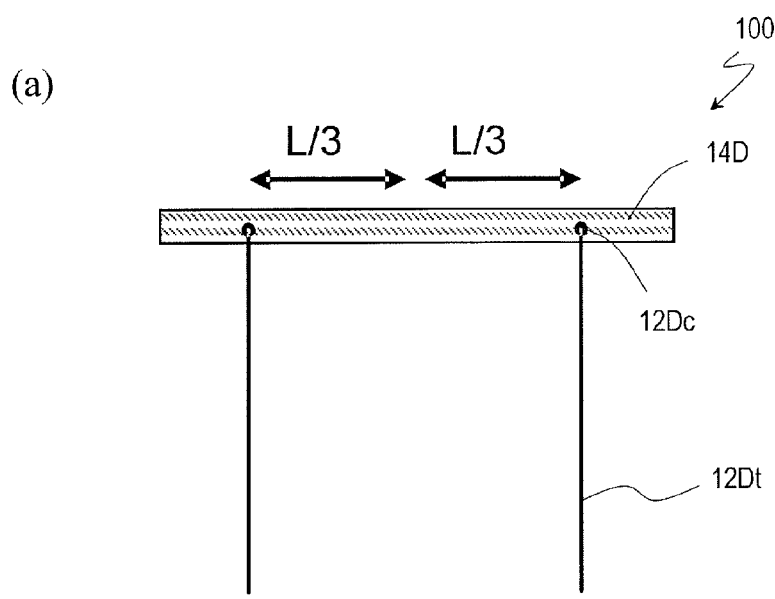
(b)
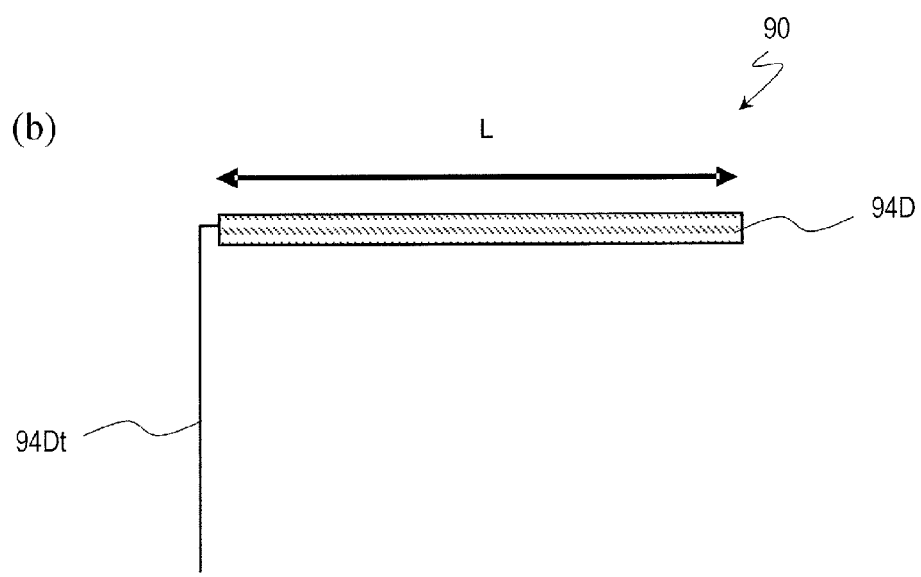

FIG.4

| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | ○ | | | | | | | | | | | | | | | | | | | | | | | | | | | | | | |
| 2 | | ○ | | | | | | | | | | | | | | | | | | | | | | | | | | | | | |
| 3 | | | ○ | | | | | | | | | | | | | | | | | | | | | | | | | | | | |
| 4 | | | | ○ | | | | | | | | | | | | | | | | | | | | | | | | | | | |
| 5 | | | | | ○ | | | | | | | | | | | | | | | | | | | | | | | | | | |
| 6 | | | | | | ○ | | | | | | | | | | | | | | | | | | | | | | | | | |
| 7 | | | | | | | ○ | | | | | | | | | | | | | | | | | | | | | | | | |
| 8 | | | | | | | | ○ | | | | | | | | | | | | | | | | | | | | | | | |
| 9 | | | | | | | | | ○ | | | | | | | | | | | | | | | | | | | | | | |
| 10 | | | | | | | | | | ○ | | | | | | | | | | | | | | | | | | | | | |
| 11 | | | | | | | | | | | ○ | | | | | | | | | | | | | | | | | | | | |
| 12 | | | | | | | | | | | | ○ | | | | | | | | | | | | | | | | | | | |
| 13 | | | | | | | | | | | | | ○ | | | | | | | | | | | | | | | | | | |
| 14 | | | | | | | | | | | | | | | | | ○ | | | | | | | | | | | | | | |
| 15 | | | | | | | | | | | | | | | ○ | | | | | | | | | | | | | | | | |
| 16 | | | | | | | | | | | | | | | | ○ | | | | | | | | | | | | | | | |
| 17 | | | | | | | | | | | | | | ○ | | | | | | | | | | | | | | | | | |
| 18 | | | | | | | | | | | | | | | | | | ○ | | | | | | | | | | | | | |

LEAD LINE 12Dt

CONTACT PORTION 12Dc

DRIVING ELECTRODE 14D

FIG.6
(a)
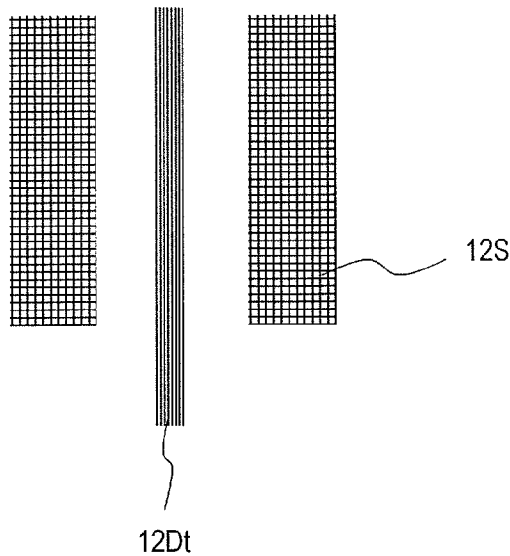
12S
12Dt
(b) 
DL1
(c) 
DL1
DL2
(d) 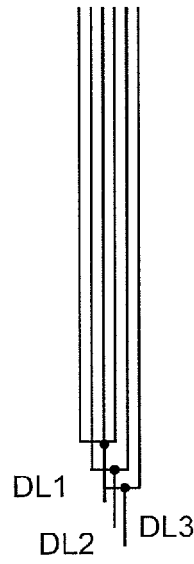
DL1
DL2 DL3
(e) 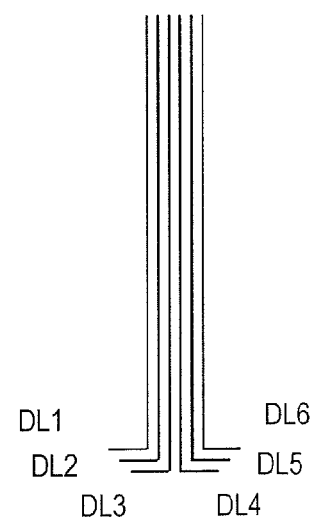
DL1  DL6
DL2  DL5
DL3  DL4

FIG. 7
(a)
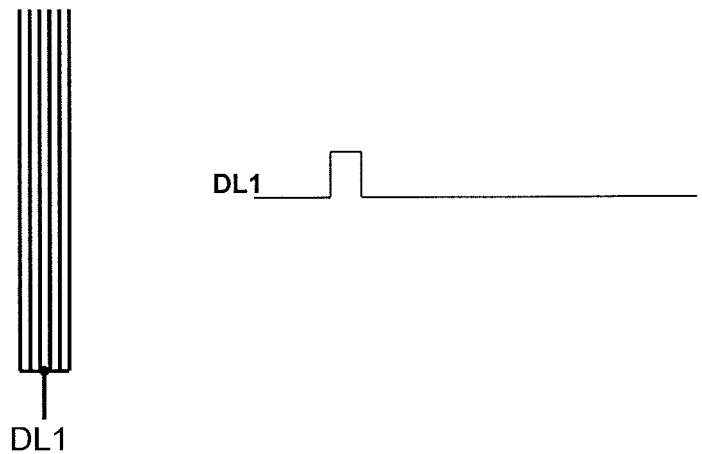
(b)
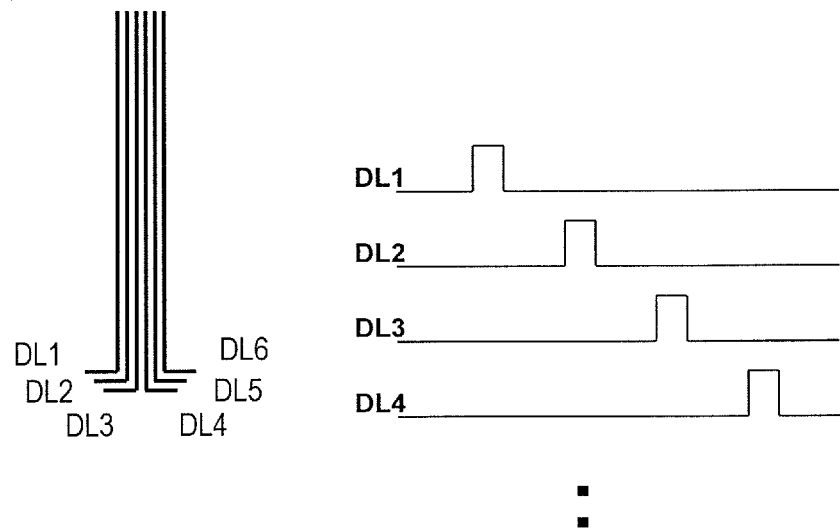

FIG.8
(a)
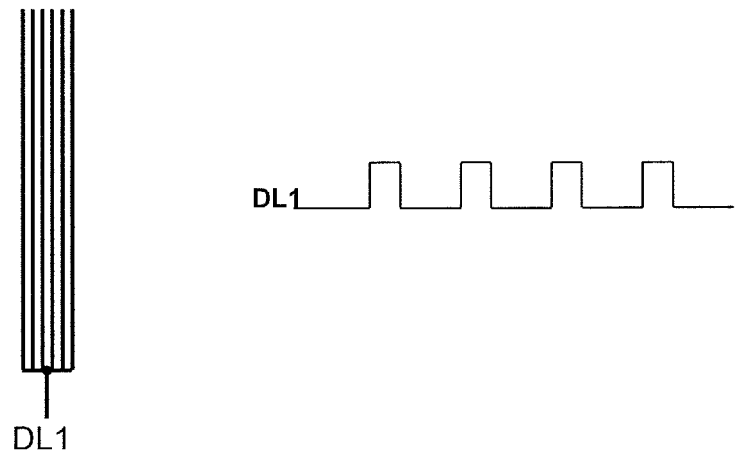
(b)
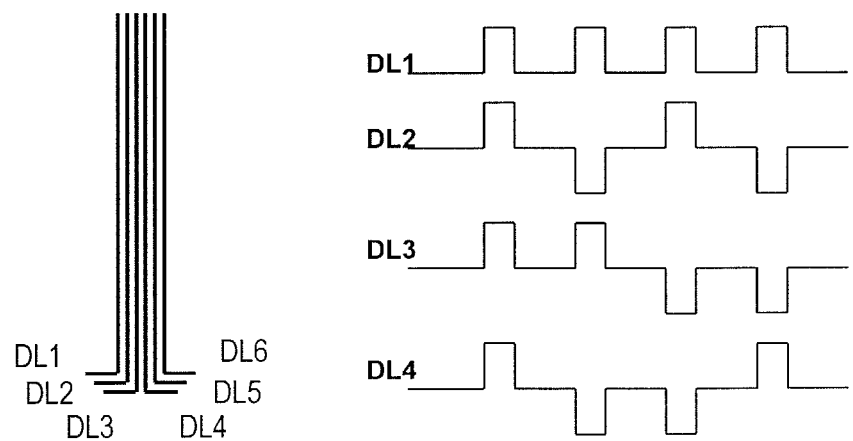

*FIG. 12*
(a)
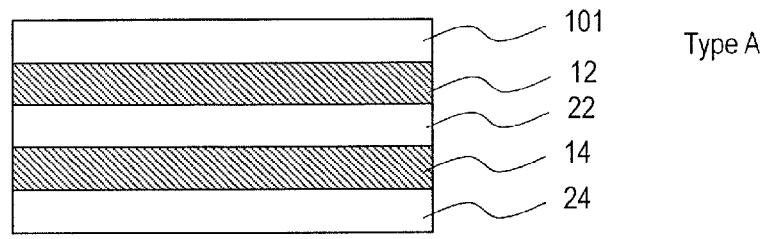
Type A
(b)
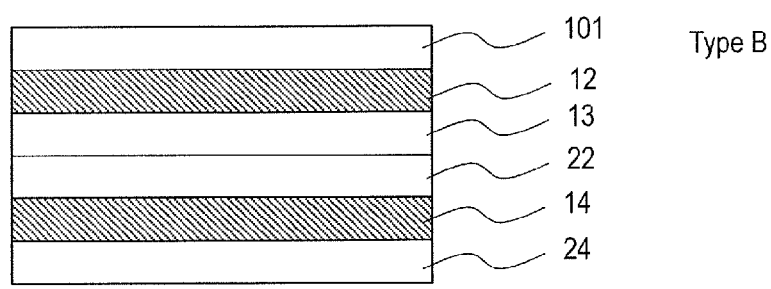
Type B
(c)
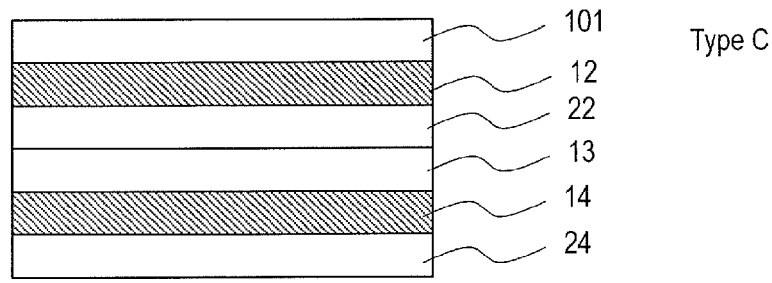
Type C
*FIG. 13*
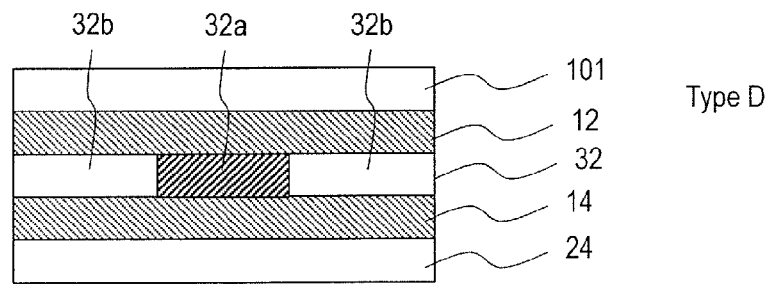
Type D FIG.14
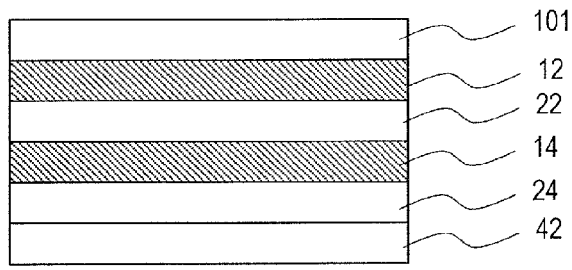
(a) Type A2
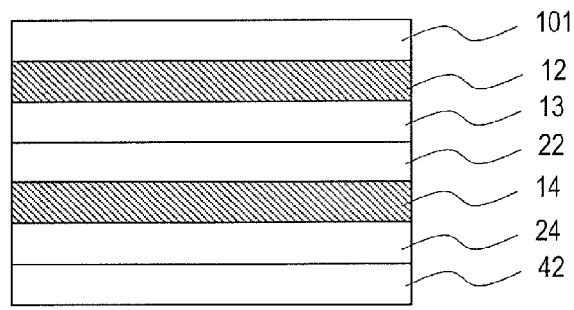
(b) Type B2
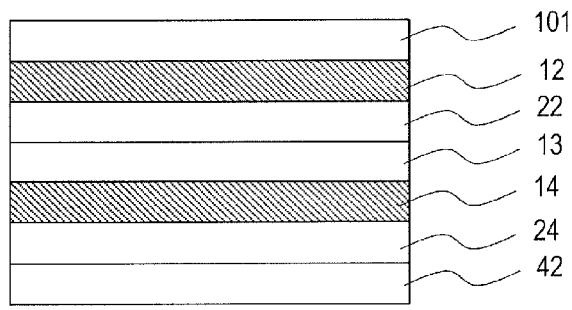
(c) Type C2
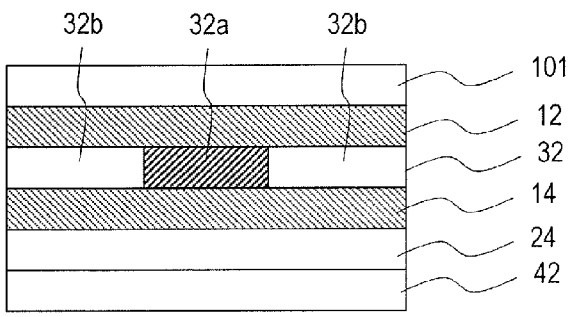
(d) Type D2

*FIG.15*
(a)
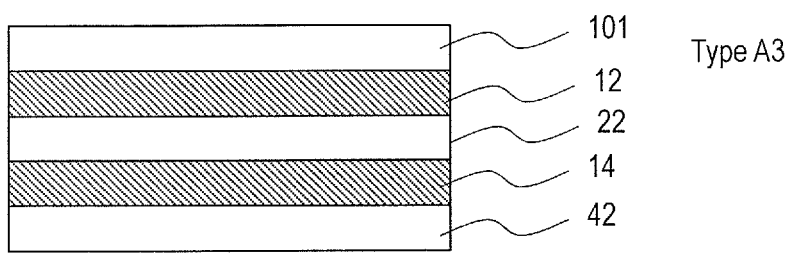
Type A3
(b)
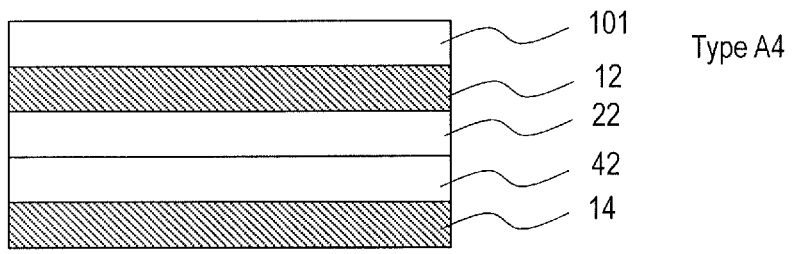
Type A4

TOUCHSCREEN PANEL WITH DRIVING ELECTRODES CONNECTED TO A PLURALITY OF LEAD LINES EXTENDING IN PARALLEL TO SENSING ELECTRODES

TECHNICAL FIELD

The present invention relates to a touchscreen panel, and more particularly to a capacitive touchscreen panel.

BACKGROUND ART

In recent years, touchscreen panels have come to be broadly used in smartphones, tablet type mobile terminal devices, and the like. Various approaches are known for touchscreen panels, e.g., the resistive type, the capacitive type, and the optical type. Among others, projected capacitive touchscreen panels are becoming prevalent because of their multi-touch capabilities and highly precise detection of touched positions. Hereinafter, touchscreen panels which are combined with TFT type liquid crystal display panels (hereinafter referred to as TFT-LCDs) as their display panels will be described. It will be appreciated that display panels are not limited to TFT-LCDs, but various display panels can be used, e.g., organic EL display panels and electrophoretic display panels.

Touchscreen panels come in add-on types (i.e., those including a touch panel that is disposed on the viewer side of a polarizer (called a front polarizer) which is already disposed on the viewer side) as well as ON-cell types and IN-cell types. Herein, ON-cell types and IN-cell types will be collectively referred to as integrated types. As used herein, a cell means a display cell. For example, a liquid crystal display cell would include a pair of substrates (e.g., a TFT substrate and a counter substrate) opposing each other via a liquid crystal layer, and is not inclusive of the polarizer(s). ON-cell types refer to those in which a layer that is responsible for touchscreen function is interposed between a polarizer and a counter substrate of the liquid crystal display cell, whereas IN-cell types refer to those in which a layer that is responsible for touchscreen function is provided on the liquid crystal layer side of the counter substrate of the liquid crystal display cell, or on the TFT substrate. As compared to an add-on type touchscreen panel, an integrated type touchscreen panel is advantageous with its thinner profile of the entire device (including the TFT-LCD as well as the touch panel), light weight, and narrow frame, while also having the advantage of enhanced transmittance.

Patent Document 1 discloses a capacitive touchscreen panel of the IN-cell type. The touchscreen panel described in Patent Document 1 includes a single electrically conductive layer that has been patterned, in which a plurality of sensing electrodes (also referred to as "receiving electrodes") and a plurality of driving electrodes (also referred to as "transmitting electrodes") are formed. Either the sensing electrodes or the driving electrodes extend along the Y direction, while the others extend along the X direction, such that electrostatic capacitance portions that are created in the portions where they come close define sensor portions (which are the "capacitive sensing units 5" in Patent Document 1).

Patent Document 1 provides an advantage of ease of manufacture, because of having a simple structure over any touchscreen panel which includes two electrically conductive layers (an electrically conductive layer including the sensing electrodes and an electrically conductive layer including the driving electrodes) that are located above and below a dielectric layer.

CITATION LIST

Patent Literature

[Patent Document 1] Japanese Laid-Open Patent Publication No. 2010-198615

SUMMARY OF INVENTION

Technical Problem

However, the touchscreen panel of Patent Document 1 has the following problems.

As shown in FIG. 1 of Patent Document 1, in order to allow terminals for the wiring lines (sense lines and drive lines) to be led out to one edge, it is necessary for the wiring lines to extend at length along another edge (see FIG. 2 to be illustrated later) that extends in a direction of intersecting that edge. This results in there being regions not functioning as a touchscreen panel (referred to as "non-sensitive regions") that are created around a region in which the plurality of sensor portions are arrayed (which may also be referred to as a "sensor array region" or an "active region"). This amounts to a problem of not being able to effectively utilize a TFT-LCD that features a narrow frame region.

Moreover, in the touchscreen panel of Patent Document 1, the sensing electrodes and the driving electrodes are formed in a single electrically conductive layer, and thus the wiring lines (sense lines and drive lines) for allowing the sensing electrodes and the driving electrodes to be led out to the peripheral region need to be disposed so as not to overlie one another. Therefore, the touchscreen panel of Patent Document 1 has a large number of wiring lines, thereby leading to a problem in that the resistance and parasitic capacitance (which may be abbreviated as "CR"; "CR" means a product of capacitance and resistance) of the wiring lines and/or its fluctuations are large, thus making it difficult to realize a high performance or large size.

The present invention has been made in order to solve at least one of the aforementioned problems, and an objective thereof is to provide a touchscreen panel which, among four peripheral regions that are above/below and to the right/left of the sensor array region, sufficiently reduces the widths of three peripheral regions except for the one peripheral region to which terminals of the wiring lines are to be led out, or reduces CR and/or fluctuations in the CR of the electrodes and wiring lines.

Solution to Problem

A touchscreen panel according to an embodiment of the present invention comprises: a transparent substrate; a first electrically conductive layer supported on the transparent substrate, the first electrically conductive layer including a plurality of sensing electrodes extending along a first direction; and a second electrically conductive layer including a plurality of driving electrodes extending along a second direction intersecting the first direction, the plurality of driving electrodes being electrically insulated from the plurality of sensing electrodes, wherein, the plurality of sensing electrodes and the plurality of driving electrodes define a sensor array region, the sensor array region including a plurality of sensor portions arranged in a matrix array; the first electrically conductive layer further includes a plurality of lead lines extending essentially in parallel to the first direction within the sensor array region; and each of the plurality of driving electrodes is connected to at least one of the plurality of lead lines, and terminals of the plurality of sensing electrodes and terminals of the plurality of lead lines are both provided in a neighborhood of a same edge of the transparent substrate that extends essentially in parallel to the second direction.

One embodiment further comprises an interlevel dielectric layer formed between the first electrically conductive layer and the second electrically conductive layer.

One embodiment further comprises a transparent electrically conductive layer formed between the first electrically conductive layer and the interlevel dielectric layer.

One embodiment further comprises a transparent electrically conductive layer formed between the second electrically conductive layer and the interlevel dielectric layer.

One embodiment further comprises a polymer layer between the first electrically conductive layer and the second electrically conductive layer, the polymer layer having electrically conductive regions and a non-electrically conductive region, the polymer layer being in contact with the plurality of sensing electrodes in the non-electrically conductive region and being in contact with the plurality of driving electrodes in the electrically conductive regions.

One embodiment further comprises a dielectric layer formed on the second electrically conductive layer.

In one embodiment, the plurality of driving electrodes include a driving electrode which is electrically connected to the plurality of lead lines at two sensor portions.

In one embodiment, a position at which a distance between the two sensor portions is bisected is a position at which a length of the plurality of driving electrodes along the second direction is essentially bisected, and distances between a center of the plurality of driving electrodes along the second direction and the two sensor portions are equal to about ⅓ of the length of the plurality of driving electrodes along the second direction.

In one embodiment, the plurality of driving electrodes include a driving electrode which is electrically connected to the plurality of lead lines at only one sensor portion; and the position of the only one sensor portion is a position at which a length of the plurality of driving electrodes along the second direction is essentially bisected.

In one embodiment, each of the plurality of driving electrodes is electrically connected to two or more lead lines among the plurality of lead lines.

In one embodiment, transmission signals which are supplied to the two or more lead lines electrically connected to each of the plurality of driving electrodes take a HIGH state at different points in time.

In one embodiment, transmission signals which are supplied to the two or more lead lines electrically connected to each of the plurality of driving electrodes simultaneously take a HIGH state plural times.

In one embodiment, the plurality of driving electrodes reach an edge of the transparent substrate that is parallel to the first direction.

One embodiment further comprises a display cell including a TFT substrate, a counter substrate, and a display medium layer provided between the TFT substrate and the counter substrate, wherein the transparent substrate doubles as the counter substrate.

One embodiment further comprises a display cell including a TFT substrate, a counter substrate, and a display medium layer provided between the TFT substrate and the counter substrate, wherein the second electrically conductive layer of the transparent substrate is disposed on a side of the counter substrate facing away from the display medium layer.

In one embodiment, the counter substrate further includes a counter electrode for applying a voltage across the display medium layer.

Advantageous Effects of Invention

According to the present invention, there is provided a touchscreen panel which, among four peripheral regions that are above/below and to the right/left of a sensor region, sufficiently reduces the widths of three peripheral regions except for the one peripheral region to which terminals of the wiring lines are to be led out, or reduces CR and/or fluctuations in the CR of the electrodes and wiring lines, as well as a driving method thereof.

BRIEF DESCRIPTION OF DRAWINGS

FIG. 3 (a) is a diagram schematically showing a driving electrode 14D, contact portions 12Dc, and lead lines 12Dt of the touchscreen panel 100; and (b) is a diagram schematically showing a driving electrode 94D and a lead line 94Dt of the touchscreen panel 90.

FIG. 4 A diagram showing an example of connection configuration of lead lines 12Dt of the touchscreen panel 100.

FIG. 6 (a) to (e) are diagrams showing variants of connection configuration between driving electrodes 14D and lead lines 12Dt.

FIGS. 7 (a) and (b) are diagrams schematically showing connection configuration between driving electrodes 14D and lead lines 12Dt, and corresponding transmission signals (sequential driving).

FIGS. 8 (a) and (b) are diagrams schematically showing connection configuration between driving electrodes 14D and lead lines 12Dt, and corresponding transmission signals (parallel driving).

FIGS. 12 (a) to (c) are schematic diagrams showing examples of the multilayer structure of a touchscreen panel according to an embodiment of the present invention.

FIG. 13 A schematic diagram showing another example of the multilayer structure of a touchscreen panel according to an embodiment of the present invention.

FIGS. 14 (a) to (d) are schematic diagrams showing still other examples of the multilayer structure of a touchscreen panel according to an embodiment of the present invention.

FIGS. 15 (*a*) and (*b*) are schematic diagrams showing still other examples of the multilayer structure of a touchscreen panel according to an embodiment of the present invention.

DESCRIPTION OF EMBODIMENTS

Hereinafter, with reference to the drawings, a touchscreen panel according to an embodiment of the present invention, and a driving method thereof, will be described. Although a TFT-LCD is exemplified as a display panel, the display panel is not limited to a TFT-LCD; it will be appreciated that various display panels which include a display medium layer other than a liquid crystal layer as the display medium layer may be used, e.g., an organic EL display panel or an electrophoretic display panel.

Figure 1:
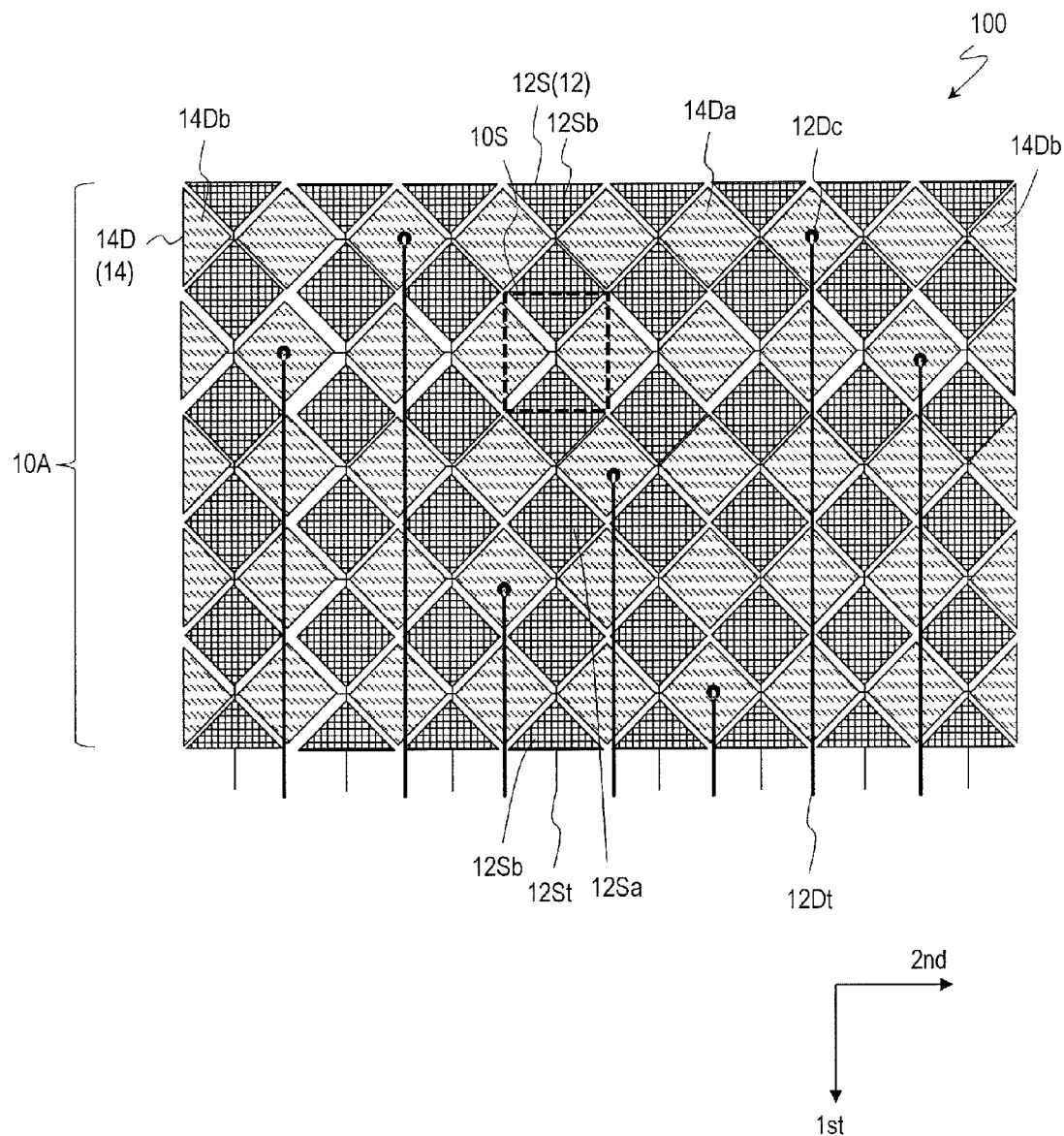
FIG. 1 A schematic diagram showing a touchscreen panel 100 according to an embodiment of the present invention.

A touchscreen panel according to an embodiment of the present invention is schematically shown in FIG. 1. FIG. 1 is a schematic plan view of a touchscreen panel 100 according to an embodiment of the present invention. In the following figures, component elements of substantially the same functions will be denoted by like reference numerals, with their description being occasionally omitted.

The touchscreen panel 100 includes: a first electrically conductive layer 12 including a plurality of sensing electrodes 12S; and a second electrically conductive layer 14 including a plurality of driving electrodes 14D which are electrically insulated from the plurality of sensing electrodes 12S. The plurality of sensing electrodes 12S extend along a first direction, and the plurality of driving electrodes 14D extend along a second direction intersecting the first direction. The first electrically conductive layer 12 and the second electrically conductive layer 14 are supported on a transparent substrate (not shown).

Herein, the plurality of sensing electrodes 12S include a plurality of sensing unit electrodes 12Sa and 12Sb. Each sensing unit electrode 12Sa is e.g. a square, which is disposed so that a diagonal direction thereof is parallel to the first direction. Any two sensing unit electrodes 12Sb which are disposed at the closest positions to the two edges extending along a direction intersecting the first direction are right triangles resulting from cutting apart a square. The sensing unit electrodes 12Sa and 12Sb constituting each sensing electrode 12S extending along the first direction are electrically connected to one another.

The plurality of driving electrodes 14D include a plurality of driving unit electrodes 14Da and 14Db. Each driving unit electrode 14Da is e.g. a square, which is disposed so that a diagonal direction thereof is parallel to the second direction. Any two driving unit electrodes 14Db which are disposed at the closest positions to the two edges extending along a direction intersecting the second direction are right triangles resulting from cutting apart a square. The driving unit electrodes 14Da and 14Db constituting each driving electrode 14D extending along the second direction are electrically connected to one another.

Around each point at which a sensing electrode 12S and a driving electrode 14D intersect each other, a sensor unit cell (hereinafter referred to as a "sensor portion") 10S is created between halves of the two sensing unit electrodes 12Sa adjoining this point (or, sensing unit electrodes 12Sb at the edge portions) and halves of two driving unit electrodes 14Da adjoining this point (or, driving unit electrodes 14Db at the edge portions). The plurality of sensor portions 10S are arranged in a matrix array, such that the matrix array of the plurality of sensor portions 10S defines a sensor array region 10A. From the electrostatic capacitances of the sensor portions 10S in the matrix array, a touched position(s) can be detected. As the method of detection, the mutual capacitance method is preferable in order to support multi-touch, but the self-capacitance method may also be used. As the circuit construction and driving method for a touchscreen panel based on the mutual capacitance method, what is described in U.S. Pat. No. 6,452,514 (corresponding Japanese application: Japanese National Phase PCT Laid-Open Publication No. 2003-526831) may be adopted, for example. The entire disclosure of U.S. Pat. No. 6,452,514 is incorporated herein by reference.

Each sensing unit electrode 12Sa and each driving unit electrode 14Da may be a mesh electrode of metal, for example, capable of transmitting e.g. 80% or more, and preferably 90% or more of the light from the display panel. The outer shape of each sensing unit electrode 12Sa and each driving unit electrode 14Da may be sized about 4 mm to 6 mm (e.g. 4 mm), for example, with each sensor region 10S being sized approximately 4 mm×4 mm. Each mesh electrode may be made of thin wires with a width of about 3 μm to 50 μm (e.g. 5 μm), for example. As the thin wires decrease in width, increase in length, and/or the density of the meshes created by the thin wires decreases, an increased electric resistance will result, and therefore a transparent electrically conductive layer may be overlaid on the mesh electrode as necessary. Moreover, without being limited to mesh electrodes, electrodes of various known patterns may be used as the sensing unit electrodes 12Sa and the driving unit electrodes 14Da.

Each of the plurality of sensing electrodes 12S extending along the first direction is connected to a sensing electrode terminal (not shown) which is provided in the neighborhood of the lower edge of the sensor array region 10A, by a sensing line 12St extending essentially in parallel to the first direction. Each sensing line 12St is formed by elongating a portion of the plurality of thin wires composing the sensing electrode 12S, for example. Therefore, the sensing electrode 12S and the sensing line 12St are made of the same electrically conductive layer.

Each of the plurality of driving electrodes 14D extending along the second direction is connected at a contact portion(s) 12Dc to at least one of a plurality of lead lines 12Dt extending essentially in parallel to the first direction in the sensor array region 10A, and is connected by the lead line(s) 12Dt to a driving electrode terminal(s) (not shown) in the neighborhood of the lower edge of the sensor array region 10A. Note that the lead lines 12Dt may be made of the same electrically conductive layer as the sensing electrodes 12S and the sensing lines 12St. The widths of a sensing line 12St and a lead line 12Dt may each independently be 0.2 mm to 1.0 mm, for example. Note that at least either the sensing lines 12St or the lead lines 12Dt may be disposed so as to overlie the light shielding portions of a black matrix of the display cell, whereby a decrease in transmittance can be reduced. Stated in reverse, so long as they are formed in a region overlying the light shielding portions of the black matrix, the widths of the wiring lines 12St and 12Dt and the size of each contact portion 12Dc may be large.

Thus, in the touchscreen panel 100, the terminals of both of the sensing electrodes 12S and the driving electrodes 14D are provided in the neighborhood of the lower edge of the sensor array region 10A (i.e., one of the edges that extend essentially in parallel to the second direction), and the lead lines 12Dt interconnecting the driving electrodes 14D and their terminal portions do not pass through regions on the right and left of the sensor array region 10A. Therefore, among four peripheral regions that are above/below and to the right/left of the sensor array region 10A, three peripheral regions except for the one peripheral region to which terminals of the wiring lines are to be led out are sufficiently reduced in width. Moreover, since the lead lines 12Dt extend linearly from the contact portions 12Dc in the sensor array region 10A to outside of the sensor array region 10A, the lengths of the lead lines 12Dt are small, and thus the CRs of the lead lines 12Dt are also small.

Figure 2:
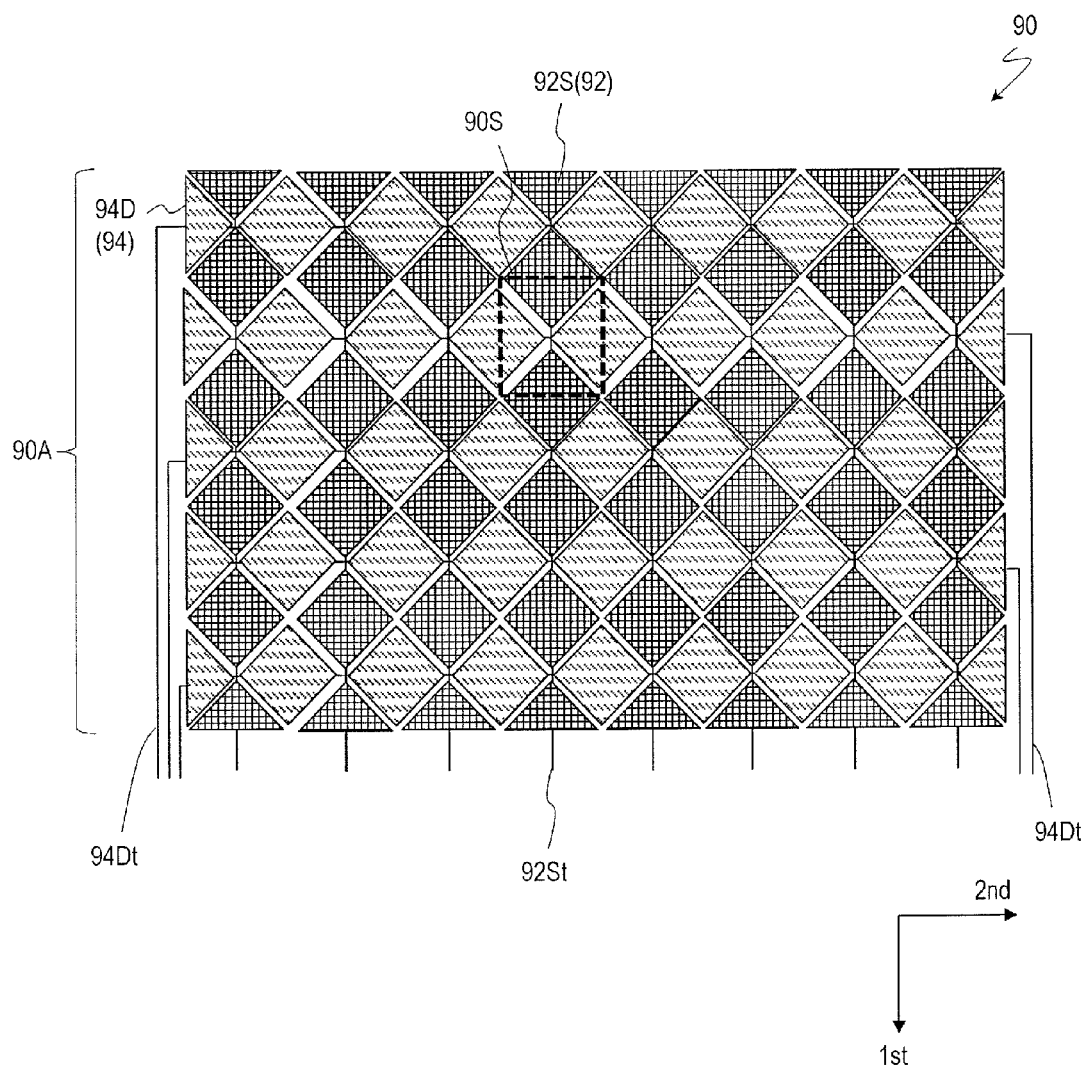
FIG. 2 A schematic diagram showing a touchscreen panel 90 of Comparative Example.

A touchscreen panel 90 according to Comparative Example shown in FIG. 2 includes: a first electrically conductive layer 92 including a plurality of sensing electrodes 92S; and a second electrically conductive layer 94 including a plurality of driving electrodes 94D which are electrically insulated from the plurality of sensing electrodes 92S. The plurality of sensing electrodes 92S extend along the first direction, whereas the plurality of driving electrodes 94D extend along a second direction intersecting the first direction.

Around each point at which a sensing electrode 92S and a driving electrode 94D intersect, a sensor portion 90S is created. The plurality of sensor portions 90S are arranged in a matrix array, such that the matrix array of the plurality of sensor portions 90S defines a sensor array region 90A.

Each of the plurality of sensing electrodes 92S extending along the first direction is connected to a sensing electrode terminal which is provided in the neighborhood of the lower edge of the sensor array region 90A, by a sensing line 92St extending essentially in parallel to the first direction. On the other hand, each of the plurality of driving electrodes 94D extending along the second direction is connected to a driving electrode terminal which is provided in the neighborhood of the lower edge of the sensor array region 90A, by a lead line 94Dt disposed in an outer region on the right or left of the sensor array region 90A. Therefore, as in the touchscreen panel described in Patent Document 1, a non-sensitive region is created around the sensor array region 90A. Furthermore, since each lead line 94Dt has a different length depending on the position of the driving electrode 94D, there is a problem in that any lead line 94Dt that is connected to a driving electrode 94D at a large distance from the lower edge of the sensor array region 90A has a large CR.

As compared to the touchscreen panel 90 of Comparative Example, it can be seen that no non-sensitive region is formed on the right or left of the sensor array region 10A, or if at all, any such non-sensitive region can be made small, the touchscreen panel 100 shown in FIG. 1. Moreover, since the lead lines 12Dt are provided in the sensor array region 10A in the touchscreen panel 100, the length of each driving electrode 14D to be charged is also small; thus the CR of the lead line 12Dt and the driving electrode 14D is also small.

Furthermore, in the touchscreen panel 100, fluctuations among the CRs associated with the lead lines 12Dt can be reduced. This will be described with reference to FIG. 3. FIG. 3(a) schematically shows a driving electrode 14D (length L), contact portions 12Dc, and lead lines 12Dt of the touchscreen panel 100. This driving electrode 14D may be, for example, the driving electrode 14D that is located the uppermost in FIG. 1. On the other hand, FIG. 3(b) schematically shows a driving electrode 94D (length L) and a lead line 94Dt of the touchscreen panel 90.

As shown in FIG. 3(a), in the touchscreen panel 100, as necessary, two or more contact portions 12Dc are provided for one driving electrode 14D at different positions (the different sensor portion(s) 10S, or the different driving unit electrode(s) 14Da, 14Db) and two or more lead lines 12Dt are provided, thereby ensuring that the total CR of the lead line 12Dt which is connected to that driving electrode 14D matches the total CR of the lead line 12Dt which is connected to any other driving electrode 14D. In the example shown in FIG. 3(a), the position at which the distance between two contact portions 12Dc is bisected is a position at which the length L of the driving electrode 14D along the second direction is essentially bisected, and the distances between the center of the driving electrode 14D along the second direction and the two contact portions 12Dc are equal to about one third (L/3) of the length of the driving electrode 14D along the second direction.

In the touchscreen panel 90 of Comparative Example, as shown in FIG. 3(b), one lead line 94Dt is connected to an end of one driving electrode 94D, so that the CR of the lead line 94Dt will differ depending on the length of the lead line 94Dt.

An example of connection configuration of the lead lines 12Dt in the touchscreen panel 100 is shown in FIG. 4. FIG. 4 shows a matrix (table) of numbers of the driving electrodes 14D and numbers of the lead lines 12Dt in the touchscreen panel 100, where positions at which contact portions 12Dc are formed are indicated as "○". The matrix shown in FIG. 4 corresponds to the sensor array region 10A of the touchscreen panel 100 shown in FIG. 1. No. 1 among the driving electrodes 14D corresponds to the driving electrode 14D in the uppermost row of FIG. 1; No. 18 among the driving electrodes 14D corresponds to the driving electrode 14D in the lowermost row of FIG. 1; No. 1 among the lead lines 12Dt corresponds to the lead line 12Dt in the leftmost column of FIG. 1; and No. 31 among the lead lines 12Dt corresponds to the lead line 12Dt in the rightmost column of FIG. 1.

As shown in FIG. 4, any driving electrode 14D that is close to the edge along which the terminals are formed (Nos. 14 to 18) is electrically connected to the lead line 12Dt via only one contact portion 12Dc, whereas any farther driving electrode 14D (Nos. 1 to 13) is electrically connected to the lead line 12Dt at two contact portions 12Dc. The only contact portion 12Dc is provided at a position at which the length L of the driving electrode 14D along the second direction is essentially bisected. The two contact portions 12Dc are positioned so that the longest length of the driving electrode 14D to be charged is L/3 from either contact portion 12Dc. By thus connecting the lead line 12Dt and optionally adjusting for the length to extend below the sensor array region 10A, fluctuations among the CRs associated with the lead lines 12Dt can be reduced.

Figure 5:
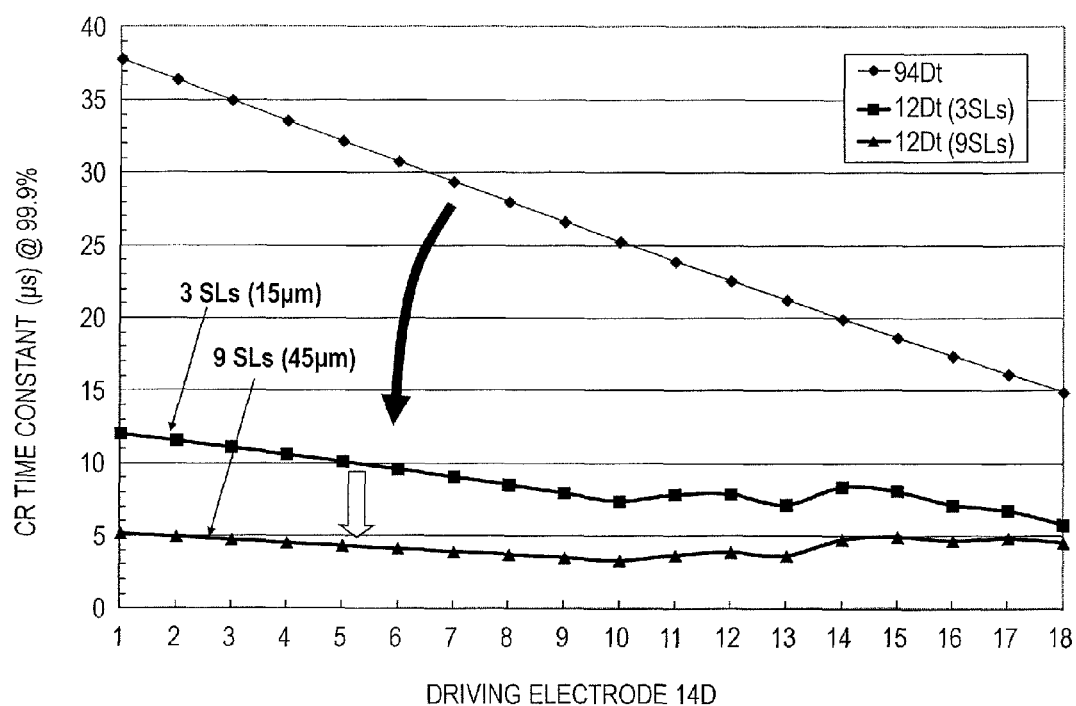
FIG. 5 A diagram showing simulation results of determining CR time constants of the respective driving electrodes 14D in a touchscreen panel diagonally measuring 8.8 inches.

A specific example will be described with reference to FIG. 5. FIG. 5 shows simulation results of determining CR time constants of the respective driving electrodes 14D (the time required for charging up to 99.9% of the target potential) in a touchscreen panel diagonally measuring 8.8 inches.

The numbers for the driving electrodes 14D correspond to the numbers of the driving electrodes 14D shown in FIG. 4. In FIG. 5, "94Dt" indicates results of adopting the connection configuration for the touchscreen panel 90 of Comparative Example as shown in FIG. 2, whereas "12Dt (3SLs)" and "12Dt (9SLs)" indicate results of adopting the connection configuration shown in FIG. 4. 3SLs and 9SLs respectively indicate that the number of thin wires (width 5 μm) composing one lead line 12Dt is three and nine, respectively corresponding to the lead line 12Dt having the widths of 15 μm and 45 μm.

As the results for 94Dt in FIG. 5 indicate, the CR time constant values are as large as about 15 μsec or more. Moreover, the driving electrode 94D that is the closest to its terminal (i.e., connected to the shortest lead line 94Dt) has the smallest CR time constant (about 15 μsec), whereas the driving electrode 94D that is the farthest from its terminal (i.e., connected to the longest lead line 94Dt) has the largest CR time constant (about 38 μsec). Thus, in the touchscreen panel of Comparative Example, fluctuations among the CR time constant are also large. On the other hand, as the results for 12Dt in FIG. 5 indicate, adopting the connection configuration shown in FIG. 4 allows the CR time constants of the driving electrodes 14D to be reduced, and also the fluctuations among the CR time constants to be reduced. Therefore, as compared to the touchscreen panel 90 of Comparative Example, the touchscreen panel 100 according to an embodiment of the present invention has a high performance, and provides the advantage of being capable of highly precise touched position detection and/or ease of implementation in large sizes.

A construction has been described with reference to FIG. 4 in which some of the driving electrodes 14D have contact portions 12Dc provided at two different positions (sensor portions) of the driving electrode 14D, so as to allow two lead lines 12Dt to be connected thereto. However, without being limited thereto, the connection configuration between driving electrodes 14D and lead lines 12Dt permits various modifications. This will be described with reference to FIGS. 6(a) to (e) and FIGS. 7(a) and (b).

As schematically shown in FIG. 6(a), each lead line 12Dt is disposed between two adjacent sensing electrodes 12S. Herein, the driving electrode 14D is omitted from illustration, and attention is paid to the relative positioning between the lead line 12Dt and the sensing electrodes 12S.

A transmission signal which is supplied to the driving electrode 14D via the lead line 12Dt will induce noise in the sensing electrodes 12S that are adjacent to the lead line 12Dt. This noise is essentially in proportion to the value of coupling capacitance between the lead line 12Dt and the sensing electrodes 12S. That is, as compared to the case where the lead line 12Dt formed between two adjacent sensing electrodes 12S is connected to only one driving electrode 14D ("DL1" is meant to be connected to the first driving electrode) as shown in FIG. 6(b), the value of coupling capacitance between each lead line 12Dt and the sensing electrodes 12S is more reduced in the case where it is connected to two different driving electrodes (including DL1 being connected to the first driving electrode and DL2 being connected to the second driving electrode) as shown in FIG. 6(c), and noise is consequently reduced. Noise can be further reduced in the case where it is connected to three different driving electrodes as shown in FIG. 6(d), or where it is connected to six different driving electrodes as shown in FIG. 6(e). In these cases, the lead line 12Dt which is provided between two adjacent sensing electrodes 12S includes two or more lead lines 12Dt that are electrically independent of each other.

For instance, FIG. 6(e) shows an example where a lead line DL1 that is connected to the first driving electrode, a lead line DL2 that is connected to the second driving electrode, a lead line DL3 that is connected to the third driving electrode, a lead line DL4 that is connected to the fourth driving electrode, a lead line DL5 that is connected to the fifth driving electrode, and a lead line DL6 that is connected to the sixth driving electrode are provided between two adjacent sensing electrodes 12S. Six such lead lines DL1 to DL6 to be disposed between adjacent sensing electrodes 12S may be, as will be shown later in FIG. 27, for example, provided in four different locations (interspaces between adjacent sensing electrodes 12S), and are connected to a number of corresponding driving electrodes 14D at a number of different positions (the sensor portion(s) 10S, or the driving unit electrode(s) 14Da, 14Db), via the contact portions 12Dc. For instance, in the example shown in FIG. 27, the first driving electrode 14D is connected to four lead lines DL1 in four different locations, via the contact portions 12Dc.

It will be appreciated that sets of six lead lines DL1 to DL6 may be provided in six different locations, such that the first driving electrode 14D is connected to six lead lines DL1 in six different locations. The number and combination of lead lines to be provided between adjacent sensing electrodes 12S are not limited to the aforementioned example, but may be variously designed so that, as described earlier, the CR time constants of the driving electrodes 14D are reduced and also fluctuations among the CR time constants are reduced among the respective driving electrodes.

The transmission signals to be supplied to the plurality of driving electrodes 14D are supplied in such a manner that, for example, one row in the matrix array of sensor portions 10S is selected at a time (i.e., one driving electrode 14D at a time). Such a driving method is referred to as a sequential driving method (or a consecutive driving method). In a sequential driving method, for example, a transmission signal that is supplied to the first driving electrode 14D from the lead line DL1 which is connected at one place (i.e., one sensor portion 10S) takes a HIGH state (i.e., a state under a voltage having a large absolute value) only once during the period of scanning the entire sensor array region 10A, as schematically shown in FIG. 7(a). For simplicity, one pulse is illustrated for each row herein; however, plural pulses may be applied to each row.

As shown in FIG. 6(e), when adopting a construction in which six lead lines DL1 to DL6 are disposed between two adjacent sensing electrodes 12S, transmission signals to be supplied to the six lead lines DL1 to DL6 that are connected to different driving electrodes 14D take a HIGH state at different points in time, as shown in FIG. 7(b). In other words, when one of the six lead lines DL1 to DL6 takes a HIGH state, the other five are in a LOW state, whereby the noise associated with the capacitive coupling between these six lead lines DL1 to DL6 and the sensing electrodes 12S that are adjacent to these six lead lines DL1 to DL6 is reduced. The noise occurring in the sensing electrodes 12S in the case of FIG. 7(b), where each of the six lead lines DL1 to DL6 is composed of one thin wire, is approximately ⅙ of that in the case of FIG. 7(a), where one lead line DL1 is composed of six thin wires. Thus, according to an embodiment of the present invention, the CR time constants of the driving electrodes 14D are reduced and also fluctuations among the CR time constants are reduced, and yet noise can also be reduced.

The sequential driving method as described with reference to FIGS. 7(a) and (b) illustrates an example where a transmission signal that is supplied to the driving electrode 14D takes a HIGH state (i.e., a state under a voltage having a large absolute value) only once for each driving electrode 14D while the entire sensor array region 10A is being scanned; however, the method of detection is not limited thereto.

For example, as shown in FIGS. 8(a) and (b), transmission signals to be supplied to six lead lines DL1 to DL6 that are respectively connected to different driving electrodes 14D may simultaneously take a HIGH state plural times (e.g., four times). Such a driving method is referred to as a parallel driving method, and is disclosed in Japanese Laid-Open Patent Publication No. 2012-118957 by the Applicant, for example. The entire disclosure of Japanese Laid-Open Patent Publication No. 2012-118957 is incorporated herein by reference. In the parallel driving method, too, for the same reasons that were described with reference to FIGS. 7(a) and (b), the noise occurring in the sensing electrodes 12S is smaller in the case where each of the six lead lines DL1 to DL6 is composed of one thin wire as shown in FIG. 8(b), than in the case where one lead line DL1 is composed of six thin wires as shown in FIG. 8(a). Furthermore, under the parallel driving method, the plurality of HIGH states can be created by positive and negative pulses, as shown in FIG. 8(b). Supplying positive and negative pulses to the six lead lines DL1 to DL6 allows noises that occur via capacitive coupling to cancel out each other, thereby further reducing the noise to occur in the sensing electrodes 12S that are adjacent to these six lead lines DL1 to DL6.

Figure 9:
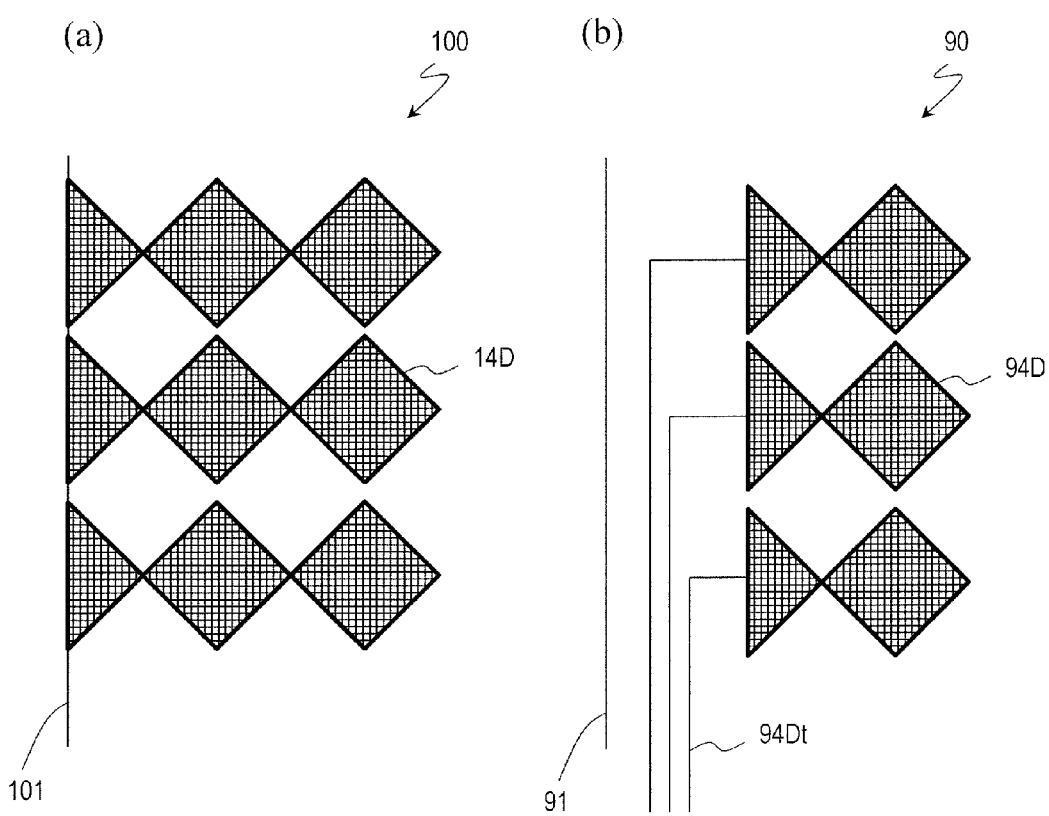
FIGS. 9 (a) and (b) are schematic diagrams showing the structure of the neighborhood of a left edge (which is parallel to a first direction) of a transparent substrate.

In the touchscreen panel 100 shown in FIG. 1, as described earlier, the terminals of both of the sensing electrodes 12S and the driving electrodes 14D are provided in the neighborhood of the lower edge of the sensor array region 10A, and the lead lines 12Dt connecting the driving electrodes 14D and their terminal portions do not pass through regions on the right and left of the sensor array region 10A. This allows, as shown in FIG. 9(a), each driving electrode 14D to be provided all the way up to the left edge (which is parallel to the first direction) of the transparent substrate 101. Typically, the left edge of each driving electrode 14 can be placed so as to essentially coincide with the left edge of the transparent substrate 101. It will be appreciated that the right edge of the driving electrode 14 may be placed so as to essentially coincide with the right edge of the transparent substrate 101.

On the other hand, in the touchscreen panel 90 of Comparative Example, as shown in FIG. 9(b), a region for accommodating the lead lines 94Dt is needed between the left edge of the driving electrode 94D and the left edge of the transparent substrate 91.

As will be clear from a comparison between FIG. 9(a) and FIG. 9(b), adopting the construction of the touchscreen panel 100 allows the touchscreen panel 100 to be disposed in close neighborhoods of the right and left edges of the transparent substrate 101, so that no non-sensitive regions are created near the right and left edges; thus, it can be suitably adopted in a display panel having a narrow frame region (e.g., a TFT-LCD panel).

Figure 10:
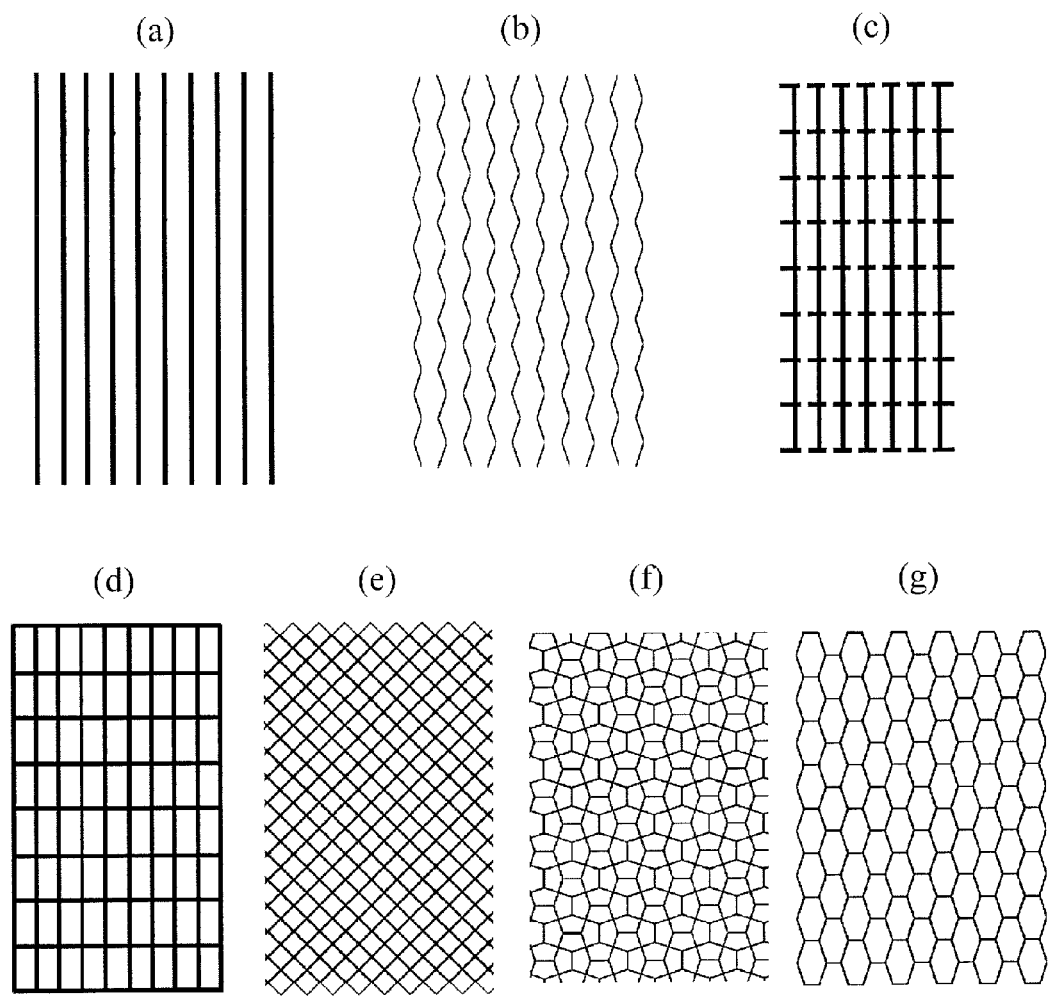
FIGS. 10 (a) to (g) are diagrams schematically showing patterns for sensing electrodes 12S, driving electrodes 14D, sensing lines 12St, and lead lines 12Dt.

Next, with reference to FIG. 10, patterns for the sensing electrodes 12S, driving electrodes 14D, sensing lines 12St, and lead lines 12Dt will be described. Patterns for these electrodes in projected capacitive touchscreen panels are known, and various electrode patterns are applicable also to the touchscreen panel 100 according to an embodiment of the present invention.

The aforementioned electrodes can be constructed by using a plurality of linearly-extending thin wires as shown in FIG. 10(a), a plurality of curved thin wires as shown in FIG. 10(b), or a plurality of linearly-extending thin wires with branched portions as shown in FIG. 10(c). Furthermore, mesh-shaped electrodes of various patterns as shown in FIGS. 10(d) to (g) may also be used. Mesh-shaped electrodes of rectangular shapes as shown in FIG. 10(d), mesh-shaped electrodes of rhombuses as shown in FIG. 10(e), mesh-shaped electrodes of close-packed pentagons as shown in FIG. 10(f), or mesh-shaped electrodes of close-packed hexagons as shown in FIG. 10(g) can be used. Moreover, these may be combined as needed.

Note that the electrode width and the thin wire width are to be adjusted as needed, for each of the sensing electrodes 12S, driving electrodes 14D, sensing lines 12St, and lead lines 12Dt. For example, as shown in FIGS. 6(c) to (e), in the case where two or more lead lines 12Dt are to be provided between two adjacent sensing electrodes 12S, the respective lead lines 12Dt must be electrically independent; therefore, in the implementations shown in FIGS. 10(d) to (g), divisions into the needed numbers may be made.

Figure 11:
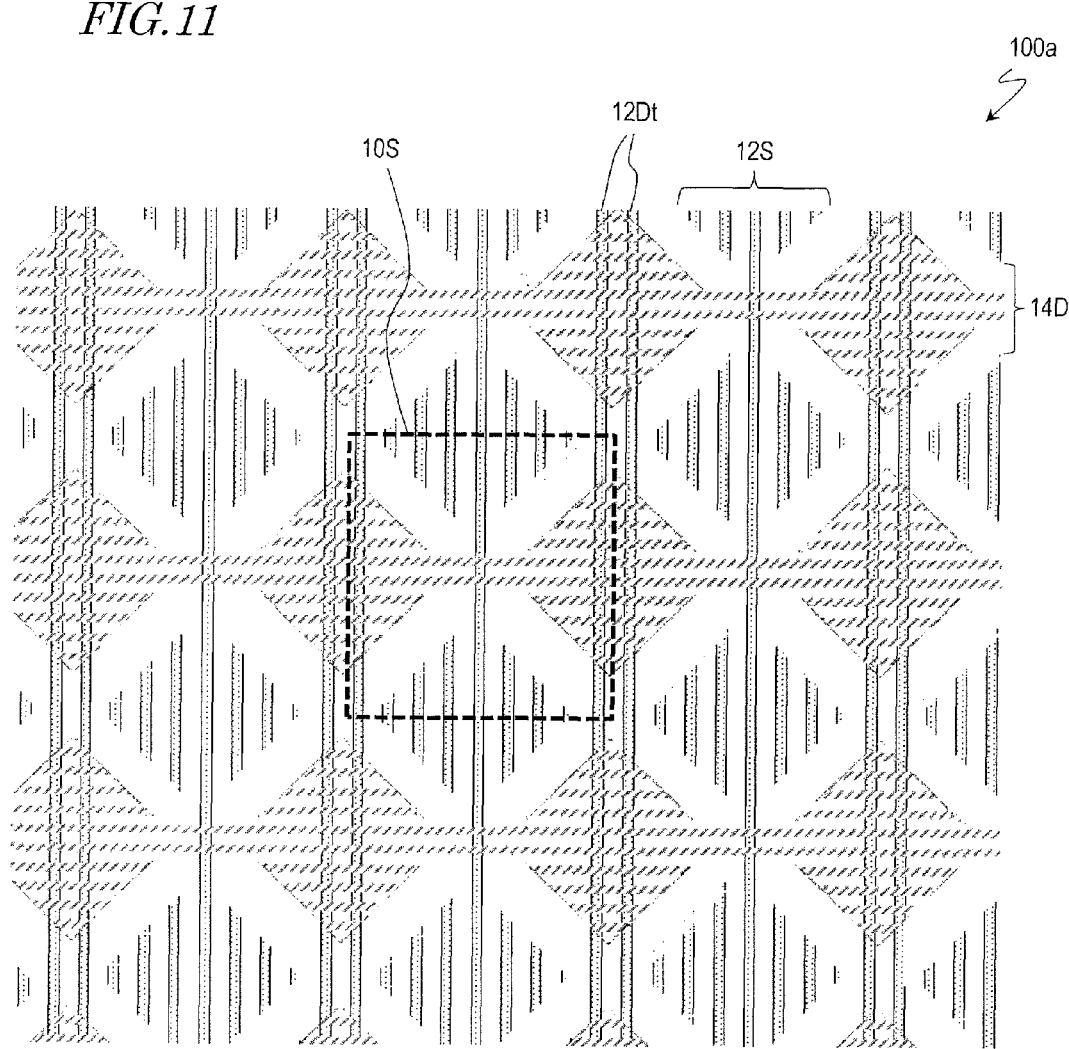
FIG. 11 A diagram showing an exemplary pattern of sensing electrodes 12S, driving electrodes 14D, and lead lines 12Dt in a touchscreen panel 100a according to an embodiment of the present invention.
Figure 16:
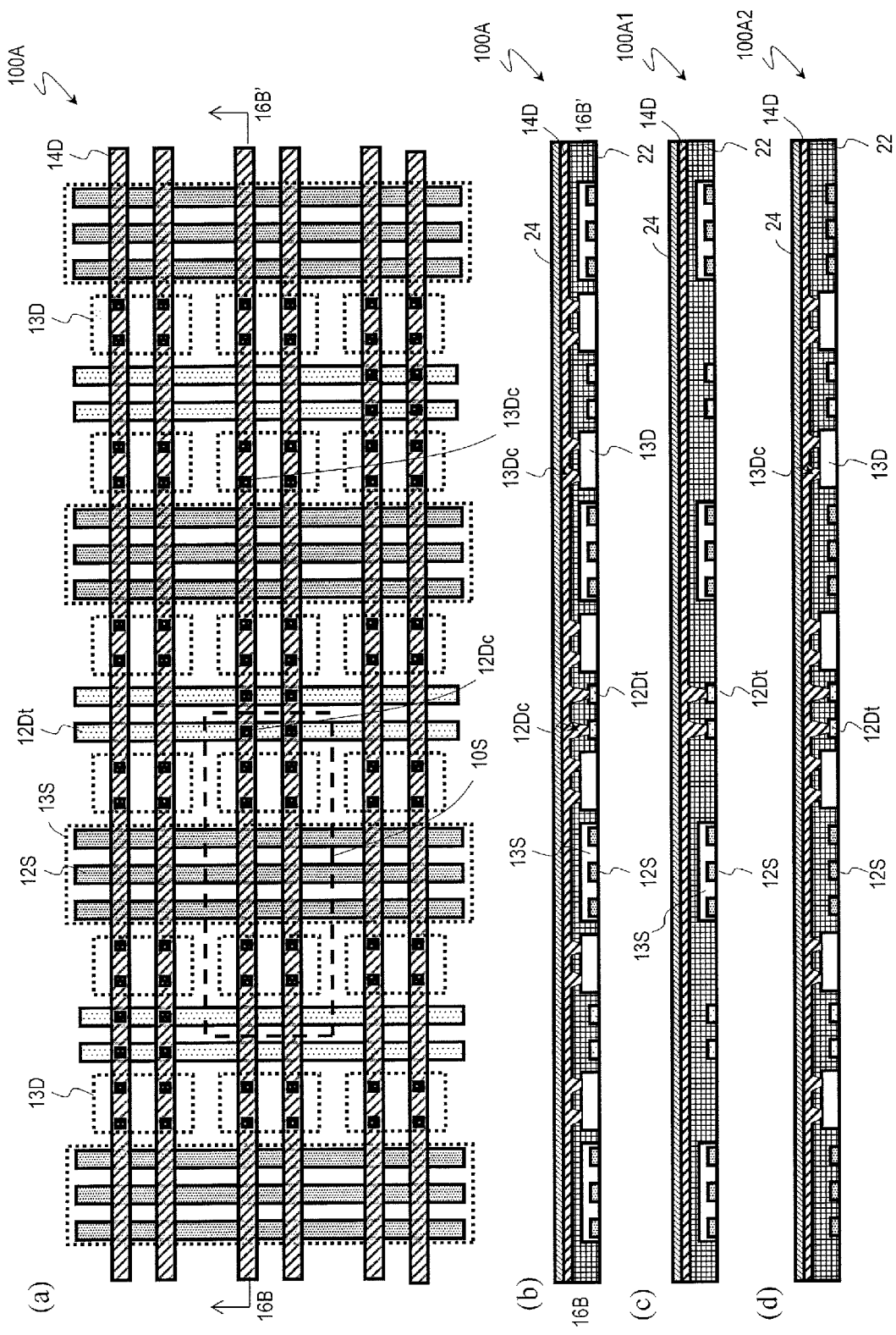
FIG. 16 (*a*) is a schematic plan view of a touchscreen panel 100A according to an embodiment of the present invention; (*b*) is a schematic cross-sectional view taken along line 16B-16B' in (*a*); and (*c*) and (*d*) are schematic cross-sectional views of touchscreen panels 100A1 and 100A2, which are modifications of the touchscreen panel 100A.
Figure 17:
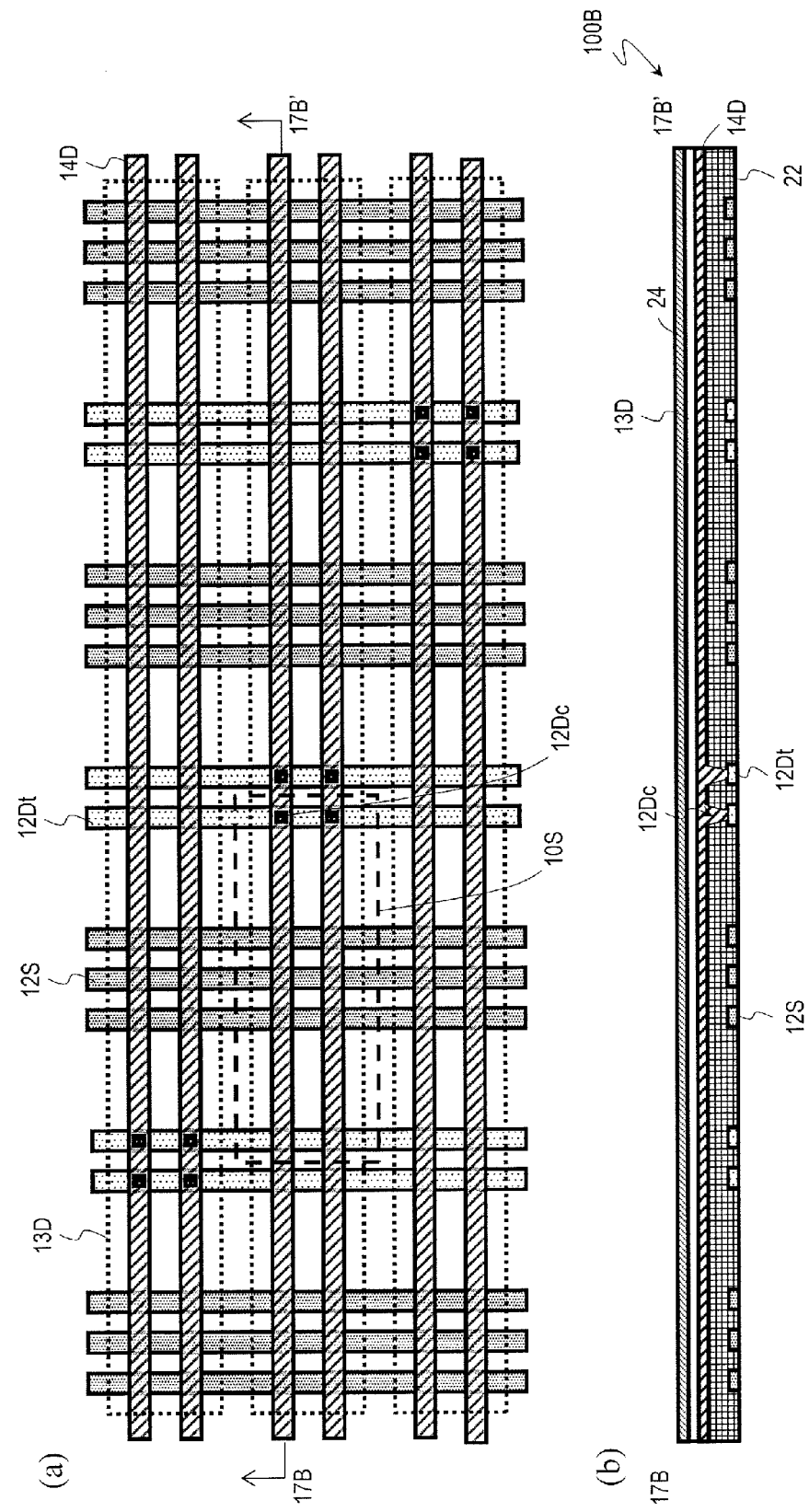
FIG. 17 (*a*) is a schematic plan view of a touchscreen panel 100B according to an embodiment of the present invention; and (*b*) is a schematic cross-sectional view taken along line 17B-17B' in (*a*).
Figure 18:
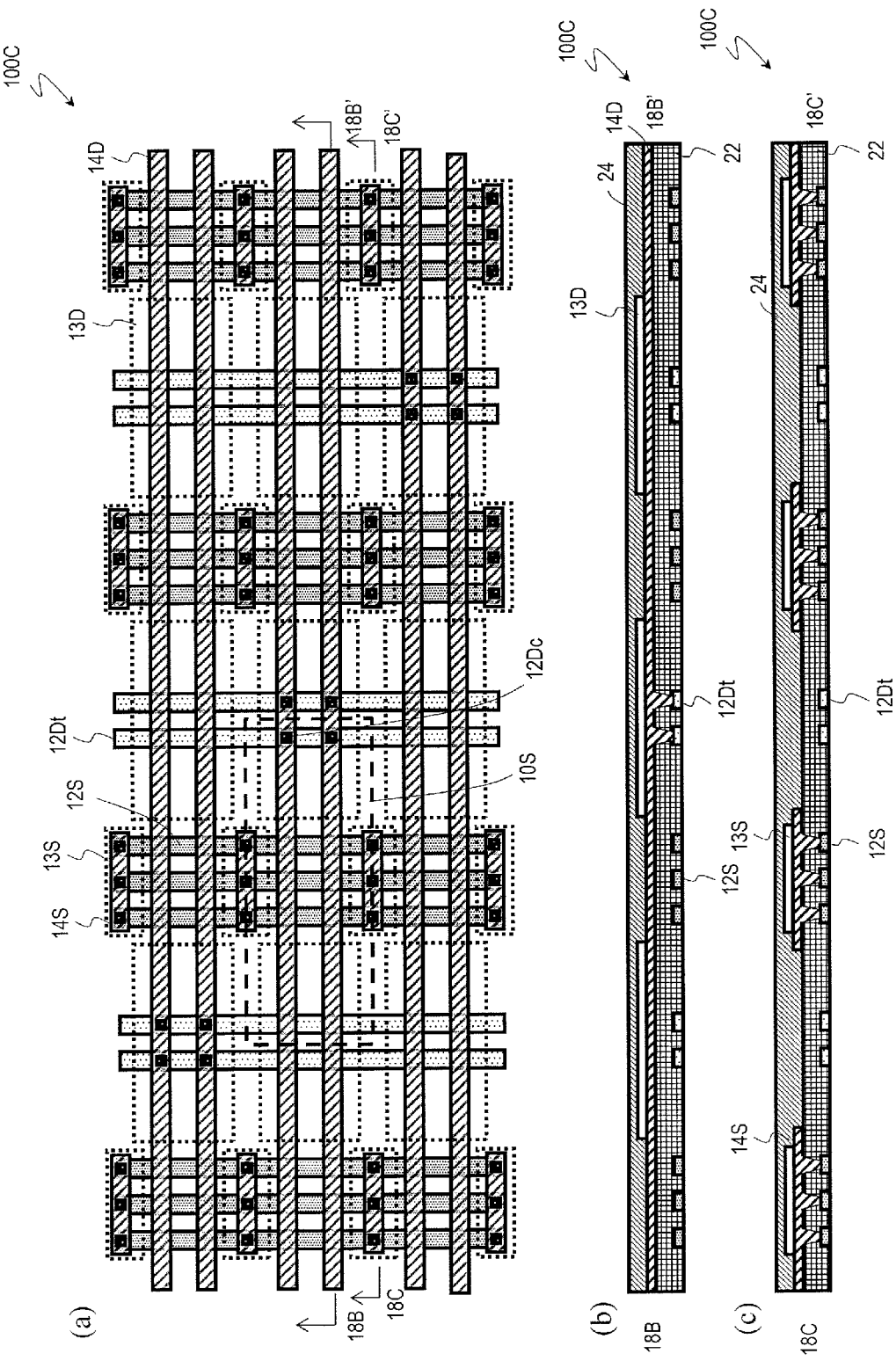
FIG. 18 (*a*) is a schematic plan view of a touchscreen panel 100C according to an embodiment of the present invention; (*b*) is a schematic cross-sectional view taken along line 18B-18B' in (*a*); and (*c*) is a schematic cross-sectional view taken along line 18C-18C' in (*a*).
Figure 19:
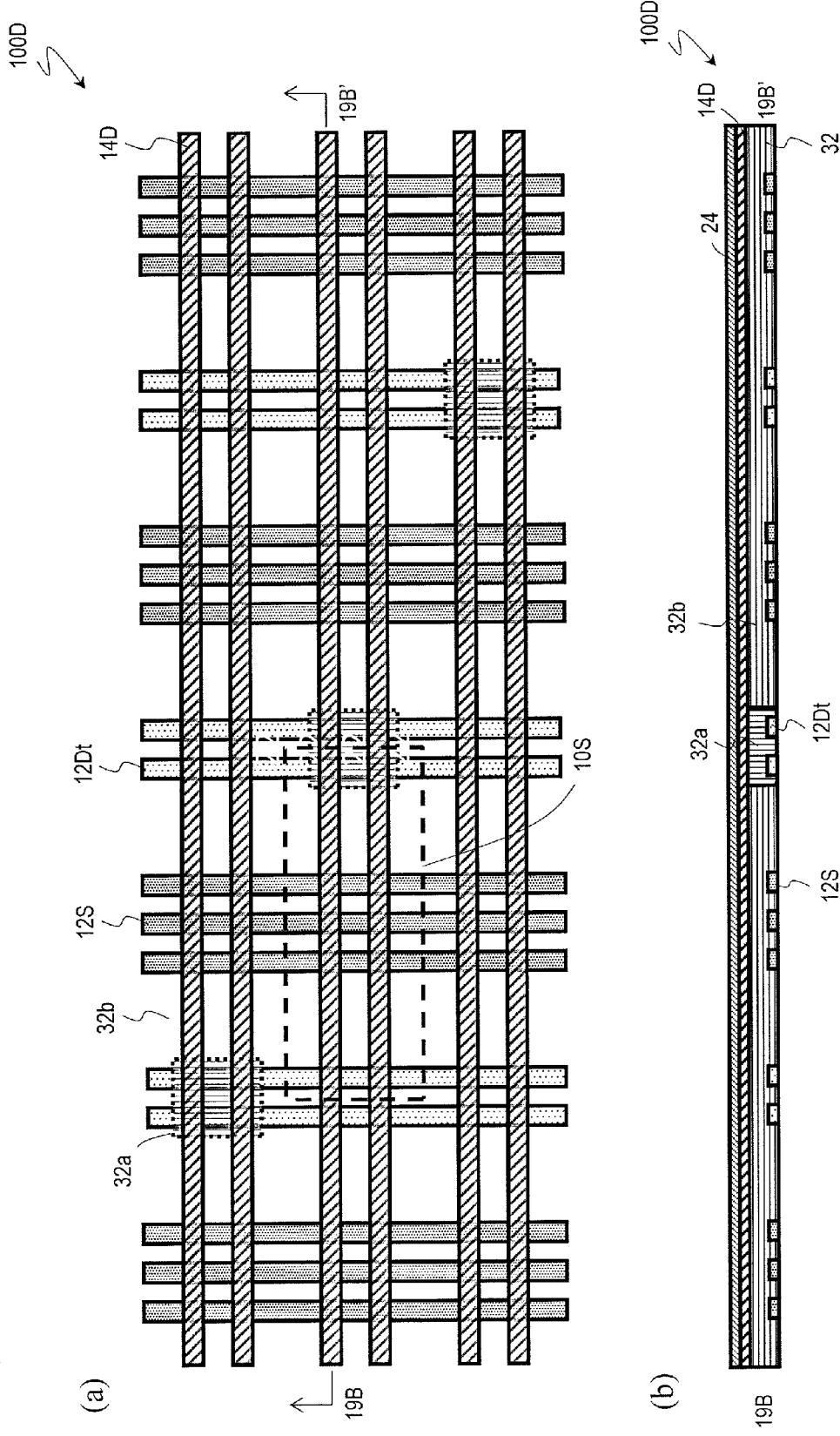
FIG. 19 (*a*) is a schematic plan view of a touchscreen panel 100D according to an embodiment of the present invention; and (*b*) is a schematic cross-sectional view taken along line 19B-19B' in (*a*).
Figure 20:
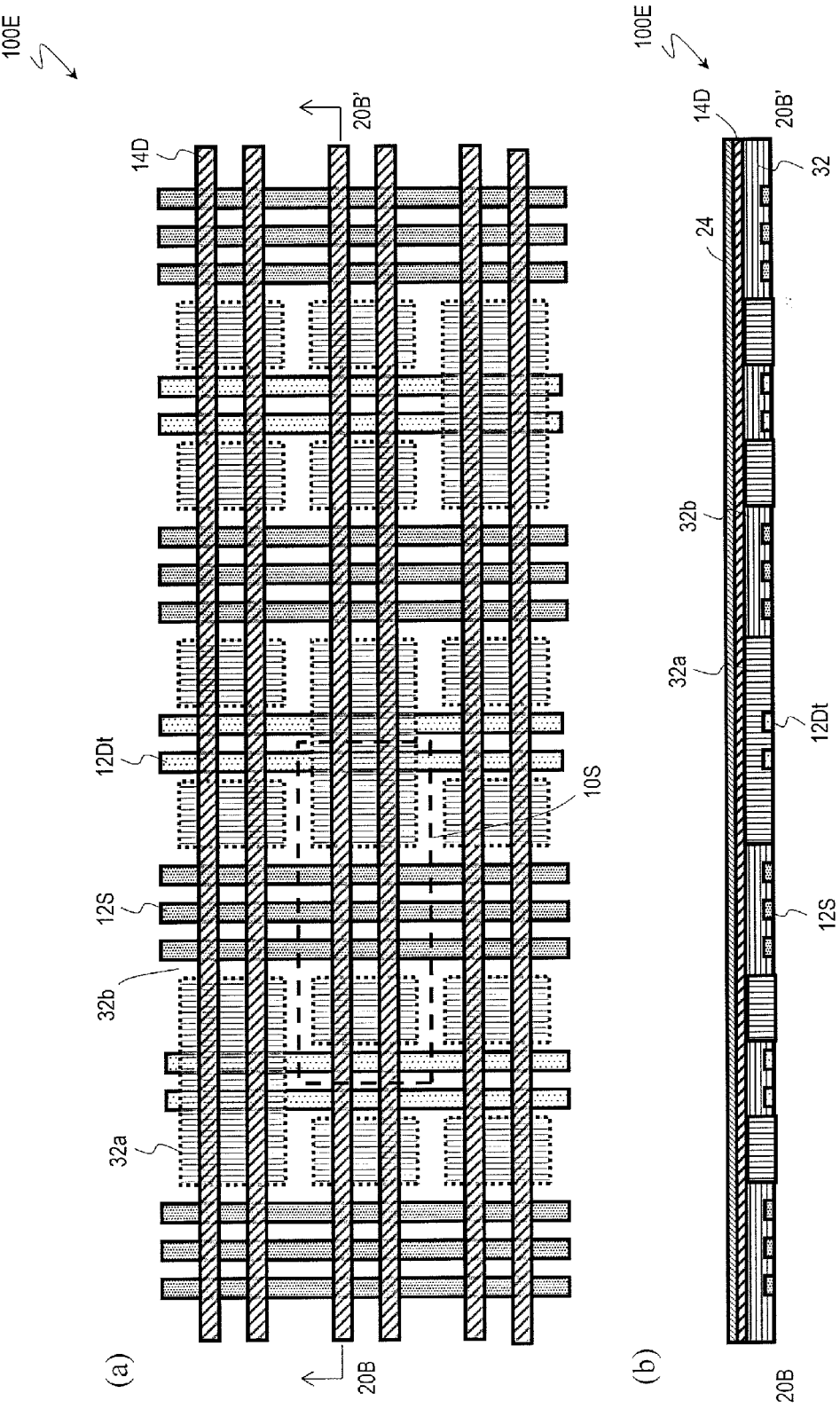
FIG. 20 (*a*) is a schematic plan view of a touchscreen panel 100E according to an embodiment of the present invention; and (*b*) is a schematic cross-sectional view taken along line 20B-20B' in (*a*).
Figure 21:
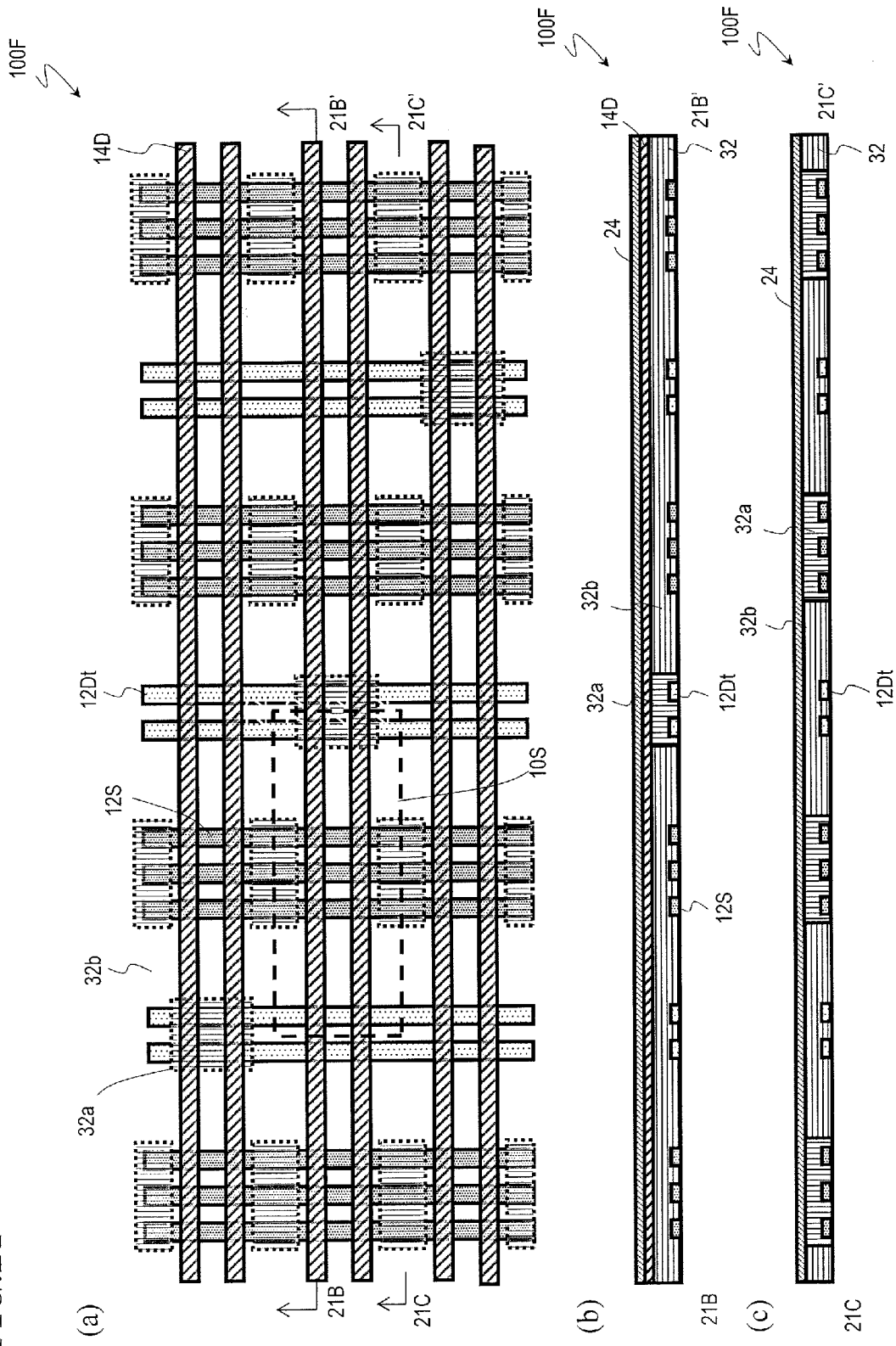
FIG. 21 (*a*) is a schematic plan view of a touchscreen panel 100F according to an embodiment of the present invention; (*b*) is a schematic cross-sectional view taken along line 21B-21B' in (*a*); and (*c*) is a schematic cross-sectional view taken along line 21C-21C' in (*a*).
Figure 22:
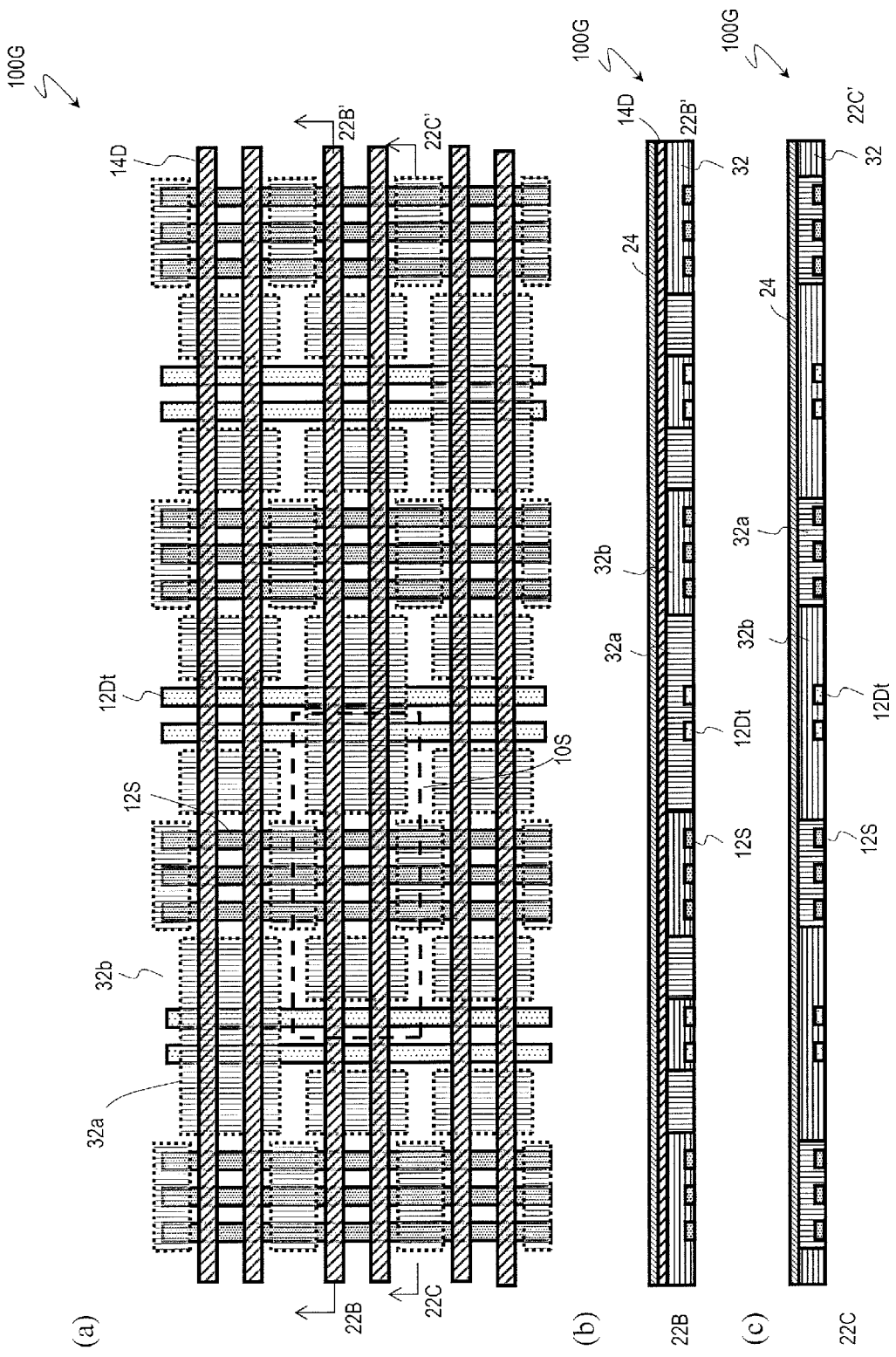
FIG. 22 (*a*) is a schematic plan view of a touchscreen panel 100G according to an embodiment of the present invention; (*b*) is a schematic cross-sectional view taken along line 22B-22B' in (*a*); and (*c*) is a schematic cross-sectional view taken along line 22C-22C' in (*a*).

FIG. 11 shows an exemplary pattern of sensing electrodes 12S, driving electrodes 14D, and lead lines 12Dt in another touchscreen panel 100a according to an embodiment of the present invention. The sensing electrode 12S in each column is made of interconnecting thin wires, whereas the driving electrode 14D in each row is made of interconnecting thin wires. A sensor portion 10S is created around each point at which a sensing electrode 12S and a driving electrode 14D intersect. Lead lines 12Dt may be two wiring lines which are electrically independent of each other, or electrically connected to each other. In the case where they are wiring lines which are independent of each other, they may be electrically connected to respectively different driving electrodes 14D.

The above embodiments and structures which are electrically equivalent to the above embodiments can be implemented by various multilayer structures. Hereinafter, with reference to FIGS. 12 to 15, specific examples of multilayer structures will be described.

The multilayer structure (which may be referred to as type A) shown in FIG. 12(a) includes a transparent substrate 101, a first electrically conductive layer 12 formed on the transparent substrate 101, an interlevel dielectric layer 22 formed on the first electrically conductive layer 12, a second electrically conductive layer 14 formed on the interlevel dielectric layer 22, and a dielectric layer 24 formed on the second electrically conductive layer 14. In the process of forming the multilayer structure, the first electrically conductive layer 12, the interlevel dielectric layer 22, the second electrically conductive layer 14, and the dielectric layer (dielectric protection layer) 24 are formed on the transparent substrate 101 consecutively in this order; therefore, "on" is defined on the basis of the transparent substrate 101. The reason why the transparent substrate 101 is shown on the upside in FIGS. 12(a) to (c) is so that the side that is touched by the user with a finger or the like faces up.

Figure 30:
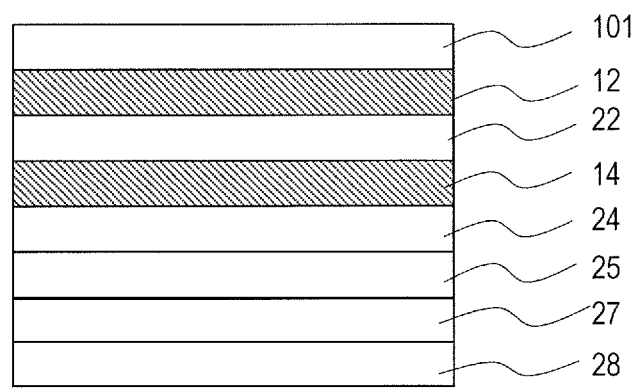
FIG. 30 A schematic diagram showing an example of the multilayer structure of a liquid crystal display panel including an ON-cell type touchscreen panel according to an embodiment of the present invention.
Figure 31:
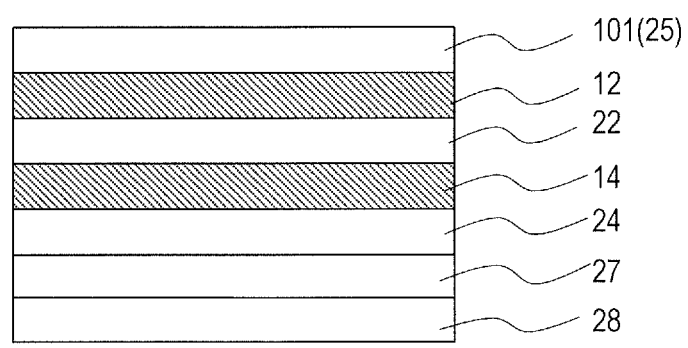
FIG. 31 A schematic diagram showing an example of the multilayer structure of a liquid crystal display panel including an IN-cell type touchscreen panel according to an embodiment of the present invention.

Moreover, a touchscreen panel according to an embodiment of the present invention can be used not only as an add-on type, but also as an integrated type. For example, in an integral form of use with the liquid crystal display cell, an IN-cell type touchscreen panel can be obtained by utilizing the transparent substrate 101 as a counter substrate of the liquid crystal display cell. On the other hand, an ON-cell type is obtained if a cover glass is placed under the dielectric layer 24 as a counter substrate of the liquid crystal display cell (see, FIG. 30). An IN-cell type is obtained if no counter substrate is placed under the dielectric layer 24 and the transparent substrate 101 of the touch panel doubles as a counter substrate of the liquid crystal display cell (see, FIG. 31). In an IN-cell type, for example, a color filter layer (not shown) is to be formed under the dielectric layer 24. Moreover, in the case where the liquid crystal display cell is of a vertical field mode (i.e., a mode which applies an electric field in a direction orthogonal to the layer plane of the liquid crystal layer; e.g., a vertical alignment mode (VA mode)) or a TN mode, a counter electrode (common electrode) is to be formed on under the dielectric layer 24 (or, in the case where there is a color filter layer, under the color filter layer)(see, for example FIG. 14). On the other hand, in a liquid crystal display cell of a lateral field mode (e.g., an IPS mode or an FFS mode), the counter electrode is to be formed on the same TFT substrate as the pixel electrodes, thus eliminating the need to form a counter electrode on the counter substrate.

The transparent substrate 101 is a transparent inorganic substrate such as a glass substrate or a transparent plastic substrate, for example. The plastic substrate includes a plastic film such as a PET film. Although FIGS. 12(a) to (c) schematically illustrate the multilayer structures for simplicity, the first electrically conductive layer 12 and the second electrically conductive layer 14 are both patterned as shown in FIG. 1; and the first electrically conductive film 12 includes a plurality of sensing electrodes 12S and lead lines 12Dt as described earlier, and typically is made of a metal film having electrical conductivity (e.g., an aluminum film or copper film having a thickness of 0.05 µm to 0.5 µm). The second electrically conductive layer 14 includes a plurality of driving electrodes 14D, and is typically made of a metal film having electrical conductivity (e.g., an aluminum film or a copper film having a thickness of 0.05 µm to 0.5 µm).

As described earlier, the sensing electrodes 12S and the driving electrodes 14D preferably both have a transmittance of 80% or more, and may be composed of thin wires for that reason. When the sensing electrodes 12S and/or driving electrodes 14D are composed only of thin wires, changes in the capacitance value when touched with a finger will be smaller than in the case of using film electrodes, so that the detected signal may be weak. In order to avoid this problem, as shown in FIG. 12(b), a transparent electrically conductive layer 13 may at least locally be formed, so as to be in contact the first electrically conductive layer 12 (which may be referred to as type B). In other words, a multilayer structure may be adopted which further includes a transparent electrically conductive layer 13 that is formed between the first electrically conductive layer 12 and the interlevel dielectric layer 22. Alternatively, as shown in FIG. 12(c), a transparent electrically conductive layer 13 may at least locally be formed so as to be in contact with the second electrically conductive layer 14 (which may be referred to as type C). In other words, a multilayer structure may be adopted which further includes a transparent electrically conductive layer 13 that is formed between the second electrically conductive layer 14 and the interlevel dielectric layer 22. Furthermore, the layering order of the transparent electrically conductive layer 13 and the first electrically conductive layer 12, and the layering order of the transparent electrically conductive layer 13 and the second electrically conductive layer 14, may be reversed. What is obtained by reversing the layering order of the transparent electrically conductive layer 13 and the first electrically conductive layer 12 in type B will be referred to as type B'. What is obtained by reversing the layering order of the transparent electrically conductive layer 13 and the second electrically conductive layer 14 in type C will be referred to as type C'.

The transparent electrically conductive layer 13 can be formed by using a known transparent electrically conductive material (e.g., ITO or indium zinc oxide (IZO (registered trademark)). Such films may have a thickness of e.g., 0.05 µm to 0.5 µm.

The interlevel dielectric layer 22 in FIG. 12(a) has contact holes not shown. The contact portions 12Dc shown in FIG. 1 are formed as the driving electrodes 14D and the lead lines 12Dt become connected within the contact holes in the interlevel dielectric layer 22. The interlevel dielectric layer 22 is formed by using a silicon dioxide film or an organic dielectric film, for example, with a thickness of e.g. 0.05 µm to 5 µm. The contact holes are formed by a known photolithography process.

As shown in FIG. 13, a polymer layer 32 having electrically conductive regions 32a and a non-electrically conductive region 32b may be provided between the first electrically conductive layer 12 and the second electrically conductive layer 14 (which may be referred to as type D). Forming the polymer layer 32 instead of the interlevel dielectric layer 22 in FIG. 12(a) allows to omit a step for forming the contact holes. As the material composing the polymer layer 32, an aqueous solution of PEDOT:PSS (e.g., "Clevios" (registered trademark)) can be used, for example. A polymer layer 32 which is formed by using an aqueous solution of PEDOT:PSS (whose polymer component has a percentage content of about 0.5 mass %) has high electrical conductivity and high transparency, but loses its electrical conductivity through light irradiation (i.e., becomes inactivated). For example, electrically conductive regions 32a with a sheet resistance of 0.1 to 100Ω/☐ and a non-electrically conductive region 32b with a sheet resistance of 1 MΩ/☐ or more are obtained. Therefore, as in the polymer layer 32 shown in FIG. 13, the polymer layer 32 having the electrically conductive regions 32a and the non-electrically conductive region 32b can be formed through a photolithography process. The non-electrically conductive region 32b of the polymer layer 32 function as the interlevel dielectric layer 22 in FIG. 12(a), whereas the electrically conductive regions 32a of the polymer layer 32 function as contact holes (or contact portions). In other words, the polymer layer 32 is in contact with the sensing electrodes 12S in the non-electrically conductive region 32b, and in contact with the driving electrodes 14D in the electrically conductive regions 32a. Although a multilayer structure in which the polymer layer 32 is provided instead of the interlevel dielectric layer 22 has been illustrated with respect to the multilayer structure (type A) shown in FIG. 12(a), it will be appreciated that the polymer layer 32 may also be provided in the multilayer structures having the transparent electrically conductive layer 13 as shown in FIG. 12(b) and FIG. 12(c) (types B and C), instead of the interlevel dielectric layer 22.

The multilayer structures of types A to C as shown in FIG. 12 and type D as shown in FIG. 13 can compose an IN-cell type touchscreen panel by allowing the transparent substrate 101 to double as a counter substrate of the liquid crystal display cell. The liquid crystal display cell in this case is limited to lateral field modes, in which the counter substrate lacks a counter electrode. In order to construct an IN-cell type touchscreen panel by using a liquid crystal display cell of a vertical field mode, in which the counter substrate includes a counter electrode, the counter electrode (transparent electrode) 42 may be provided under the dielectric layer 24 in the multilayer structures of types A, B, C and D, as shown in FIGS. 14(a) to (d). These will respectively be referred to as types A2, B2, C2 and D2. It will be appreciated that, also in constructions which are obtained by providing the polymer layer 32 instead of the interlevel dielectric layer 22 in the multilayer structures of types B and C, as has been described with reference to FIG. 13, a counter electrode (transparent electrode) 42 may be provided under the dielectric layer 24. Note that the dielectric layer 24 is formed by using a silicon dioxide film or an organic dielectric film, for example, with a thickness of e.g. 0.05 µm to 5 µm.

Furthermore, a touchscreen panel in which a liquid crystal display cell of a vertical field mode is used may be constructed so as to include, as shown in FIGS. 15(a) and (b), portions where the second electrically conductive layer 14 and the counter electrode (transparent electrode) 42 are directly in contact, i.e., so as not to include the aforementioned dielectric layer 24. As shown in FIG. 15(a), a counter electrode 42 may be formed on the second electrically conductive layer 14 being formed on the interlevel dielectric layer 22 (type A3), or as shown in FIG. 15(b), the second electrically conductive layer 14 may be formed on a counter electrode 42 which is formed on the interlevel dielectric layer 22 (type A4). At this point, the second electrically conductive layer 14 and the counter electrode 42 have been patterned. The details of the patterns will be described later (see FIG. 23A and FIG. 23B).

Next, with reference to FIG. 16 to FIG. 23B, examples of specific constructions for the touchscreen panel according to an embodiment of the present invention, i.e., examples of positioning and interconnection of the sensing electrodes 12S, driving electrodes 14D, and lead lines 12Dt, will be described. Herein, an example where a transparent electrically conductive layer 13 is included (type B and type C') and an example where a polymer layer 32 having electrically conductive regions 32a and a non-electrically conductive region 32b is included (type D) will be described. Note that, the numbers of sensing electrodes 12S, driving electrodes 14D, and lead lines 12Dt illustrated in the following figures are only exemplary; the illustrated numbers are not limiting. Moreover, the sensing electrodes 12S and the driving electrodes 14D have e.g. a mesh structure of thin wires, although omitted from illustration.

FIGS. 16(a) and (b) show a schematic structure of a touchscreen panel 100A according to an embodiment of the present invention. FIG. 16(a) is a schematic plan view of the touchscreen panel 100A; and FIG. 16(b) is a schematic cross-sectional view taken along line 16B-16B' in FIG. 16(a). FIGS. 16(c) and (d) are schematic cross-sectional views of touchscreen panels 100A1 and 100A2, which are modifications of the touchscreen panel 100A, corresponding to the cross-sectional view of FIG. 16(b). The touchscreen panels 100A, 100A1 and 100A2 all have a multilayer structure of type B.

As schematically shown in FIG. 16(a), the touchscreen panel 100A includes a plurality of sensing electrodes 12S and a plurality of driving electrodes 14D extending in a direction intersecting the plurality of sensing electrodes 12S. A sensor portion 10S is created around each point at which a sensing electrode 12S and a driving electrode 14D intersect. The touchscreen panel 100A further includes a plurality of lead lines 12Dt extending in parallel to the sensing electrodes 12S, such that the lead lines 12Dt are connected to the driving electrodes 14D at contact portions 12Dc.

As shown in FIG. 16(b), the sensing electrodes 12S and the lead lines 12Dt are made of the same electrically conductive film that is formed on a transparent substrate (not shown). In other words, the sensing electrodes 12S and the lead lines 12Dt compose the first electrically conductive layer 12 (see FIG. 12(b)). A transparent electrically conductive layer 13, which is formed on the first electrically conductive layer 12, includes: transparent conductive portions 13S overlying the sensing electrodes 12S; and transparent conductive portions 13D which are formed in regions between sensing the electrodes 12S and the lead lines 12Dt and are connected to the driving electrodes 14D. The transparent conductive portions 13D are connected to the driving electrodes 14D within contact holes which are made in an interlevel dielectric film 22 that is formed on the transparent electrically conductive layer 13, thus creating contact portions 13Dc. The driving electrodes 14D are covered by a dielectric layer 24. Thus, by overlaying the transparent conductive portions 13S on the sensing electrodes 12S and overlaying the transparent conductive portions 13D on the driving electrodes 14D, the resistance of the sensing electrodes 12S and driving electrodes 14D being composed of thin wires can be reduced; changes in the capacitance value when touched with a finger can be increased; and the intensity of a detected signal can be increased. In the touchscreen panel 100A, in particular, each sensing electrode 12S (a set of three in FIG. 16(a)) is covered by the transparent conductive portions 13S in its entirety, thus creating a significant effect of reducing the resistance of the sensing electrodes 12S and increasing changes in the capacitance value when touched with a finger.

As in a touchscreen panel 100A1 shown in FIG. 16(c), only the transparent conductive portions 13S overlying the sensing electrodes 12S may be formed, while omitting transparent conductive portions 13D to be connected to the driving electrodes 14D; or, as in a touchscreen panel 100A2 shown in FIG. 16(d), only the transparent conductive portions 13D which are connected to the driving electrodes 14D may be formed, while omitting transparent conductive portions 13S to overlie the sensing electrodes 12S.

FIGS. 17(a) and (b) show a schematic structure of a touchscreen panel 100B according to an embodiment of the present invention. FIG. 17(a) is a schematic plan view of the touchscreen panel 100B; and FIG. 17(b) is a schematic cross-sectional view taken along line 17B-17B' in FIG. 17(a). The touchscreen panel 100B has a multilayer structure of type C'. In other words, as compared to the multilayer structure of type C shown in FIG. 12(c), the layering order (relative vertical positioning) of the transparent electrically conductive layer 13 and the second electrically conductive layer 14 is reversed.

As in the touchscreen panel 100B, transparent conductive portions 13D covering each driving electrode (a set of two in the FIG. 14D in its entirety may be formed, while omitting transparent conductive portions to be connected to the sensing electrodes 12S. Each driving electrode 14D is connected to a lead line 12Dt (made of a set of two) in contact holes made in the interlevel dielectric layer 22, thus creating contact portions 12Dc.

FIGS. 18(a) to (c) show a schematic structure of a touchscreen panel 100C according to an embodiment of the present invention. FIG. 18(a) is a schematic plan view of the touchscreen panel 100C; FIG. 18(b) is a schematic cross-sectional view taken along line 18B-18B' in FIG. 18(a); and FIG. 18(c) is a schematic cross-sectional view taken along line 18C-18C' in FIG. 18(a). The touchscreen panel 100C also has a multilayer structure of type C'.

The transparent electrically conductive layer 13 of the touchscreen panel 100C includes: transparent electrode portions 13D which are formed to be in direct contact with the driving electrodes 14D; and transparent electrode portions 13S which are formed to be in direct contact with connection electrodes 14S that are formed in a manner of allowing each sensing electrode 12S as a set of three to connect to one another. The connection electrodes 14S are contained in the same second electrically conductive layer 14 as the driving electrodes 14D. By allowing the connection electrodes 14S to interconnect the three wiring lines to form one sensing electrode 12S, and by forming the transparent electrode portions 13S covering the connection electrodes 14S, the resistance of the sensing electrodes 12S can be reduced. The transparent electrode portions 13D reduce the resistance of the driving electrodes 14D, and increase changes in the capacitance value when touched with a finger.

Next, with reference to FIG. 19 to FIG. 23B, the structures of touchscreen panels 100D to 100F according to embodiments, each having a multilayer structure of type D, will be described. As shown in FIG. 13, a multilayer structure of type D includes a polymer layer 32 having electrically conductive regions 32a and a non-electrically conductive region 32b, between the first electrically conductive layer 12 and the second electrically conductive layer 14.

FIGS. 19(a) and (b) show a schematic structure of the touchscreen panel 100D according to an embodiment of the present invention. FIG. 19(a) is a schematic plan view of the touchscreen panel 100D; and FIG. 19(b) is a schematic cross-sectional view taken along line 19B-19B' in FIG. 19(a).

The touchscreen panel 100D includes a polymer layer 32 between: the sensing electrodes 12S and lead lines 12Dt (first electrically conductive layer 12); and the driving electrodes 14D (second electrically conductive layer 14). In the touchscreen panel 100D, the electrically conductive regions 32a of the polymer layer 32 are formed selectively in portions covering the lead lines 12Dt, while the non-electrically conductive region 32b is formed in any other region. The electrically conductive regions 32a of the polymer layer 32 are in contact with the lead lines 12Dt and the driving electrodes 14D, so as to electrically connect them. In other words, the electrically conductive regions 32a of the polymer layer 32 create contact portions between the lead lines 12Dt and the driving electrodes 14D, while the non-electrically conductive region 32b of the polymer layer 32 functions as an interlevel dielectric layer between the sensing electrodes 12S and the driving electrodes 14D.

FIGS. 20(a) and (b) show a schematic structure of the touchscreen panel 100E according to an embodiment of the present invention. FIG. 20(a) is a schematic plan view of the touchscreen panel 100E; and FIG. 20(b) is a schematic cross-sectional view taken along line 20B-20B' in FIG. 20(a).

A polymer layer 32 of the touchscreen panel 100E not only has electrically conductive regions 32a between the lead lines 12Dt and the driving electrodes 14D to be electrically connected, but also has electrically conductive regions 32a in regions where the lead lines 12Dt and the sensing electrodes 12S do not exist. Therefore, while creating contact portions between the lead lines 12Dt and the driving electrodes 14D, the polymer layer 32 of the touchscreen panel 100E contributes to low resistance of the driving electrodes 14D, and increases changes in the capacitance value when touched with a finger.

FIGS. 21(a) to (c) show a schematic structure of the touchscreen panel 100F according to an embodiment of the present invention. FIG. 21(a) is a schematic plan view of the touchscreen panel 100F; FIG. 21(b) is a schematic cross-sectional view taken along line 21B-21B' in FIG. 21(a); and FIG. 21(c) is a schematic cross-sectional view taken along line 21C-21C' in FIG. 21(a).

A polymer layer 32 of the touchscreen panel 100F not only has electrically conductive regions 32a between the lead lines 12Dt and the driving electrodes 14D to be electrically connected, but also has electrically conductive regions 32a which are formed in a manner of allowing each sensing electrode 12S as a set of three to connect to one another. Therefore, while creating contact portions between the lead lines 12Dt and the driving electrodes 14D, the polymer layer 32 of the touchscreen panel 100F contributes to low resistance of the sensing electrodes 12S, and increases changes in the capacitance value when touched with a finger.

FIGS. 22(a) to (c) shows a schematic structure of a touchscreen panel 100G according to an embodiment of the present invention. FIG. 22(a) is a schematic plan view of the touchscreen panel 100G; FIG. 22(b) is a schematic cross-sectional view taken along line 22B-22B' in FIG. 22(a); and FIG. 22(c) is a schematic cross-sectional view taken along line 22C-22C' in FIG. 22(a).

A polymer layer 32 of the touchscreen panel 100G not only has electrically conductive regions 32a between the lead lines 12Dt and the driving electrodes 14D to be electrically connected, but also has electrically conductive regions 32a in regions where the lead lines 12Dt and the sensing electrodes 12S do not exist, and further has electrically conductive regions 32a which are formed in a manner of allowing each sensing electrode 12S as a set of three to connect to one another. Therefore, while creating contact portions between the lead lines 12Dt and the driving electrodes 14D, the polymer layer 32 of the touchscreen panel 100G contributes to low resistance of the driving electrodes 14D and low resistance of the sensing electrodes 12S, and increases changes in the capacitance value when touched with a finger.

By providing a counter electrode (transparent electrically conductive layer) 42 on the dielectric layer 24 of the illustrated touchscreen panels 100A to 100G as shown in FIG. 14, touchscreen panels of multilayer structures of type B2, type C'2 and type D2 can be respectively obtained. Note that, as compared to the multilayer structure of type C2 shown in FIG. 14(c), the layering order (relative vertical positioning) of the transparent electrically conductive layer 13 and the second electrically conductive layer 14 is reversed in the multilayer structure of type C'2.

It will be appreciated that, other than the above, types A to D may be combined as needed, and a counter electrode 42 may be further formed on the dielectric layer 24. The touchscreen panels of the above embodiments can be used as ON-cell type or IN-cell type touchscreen panels.

Figure 23A:
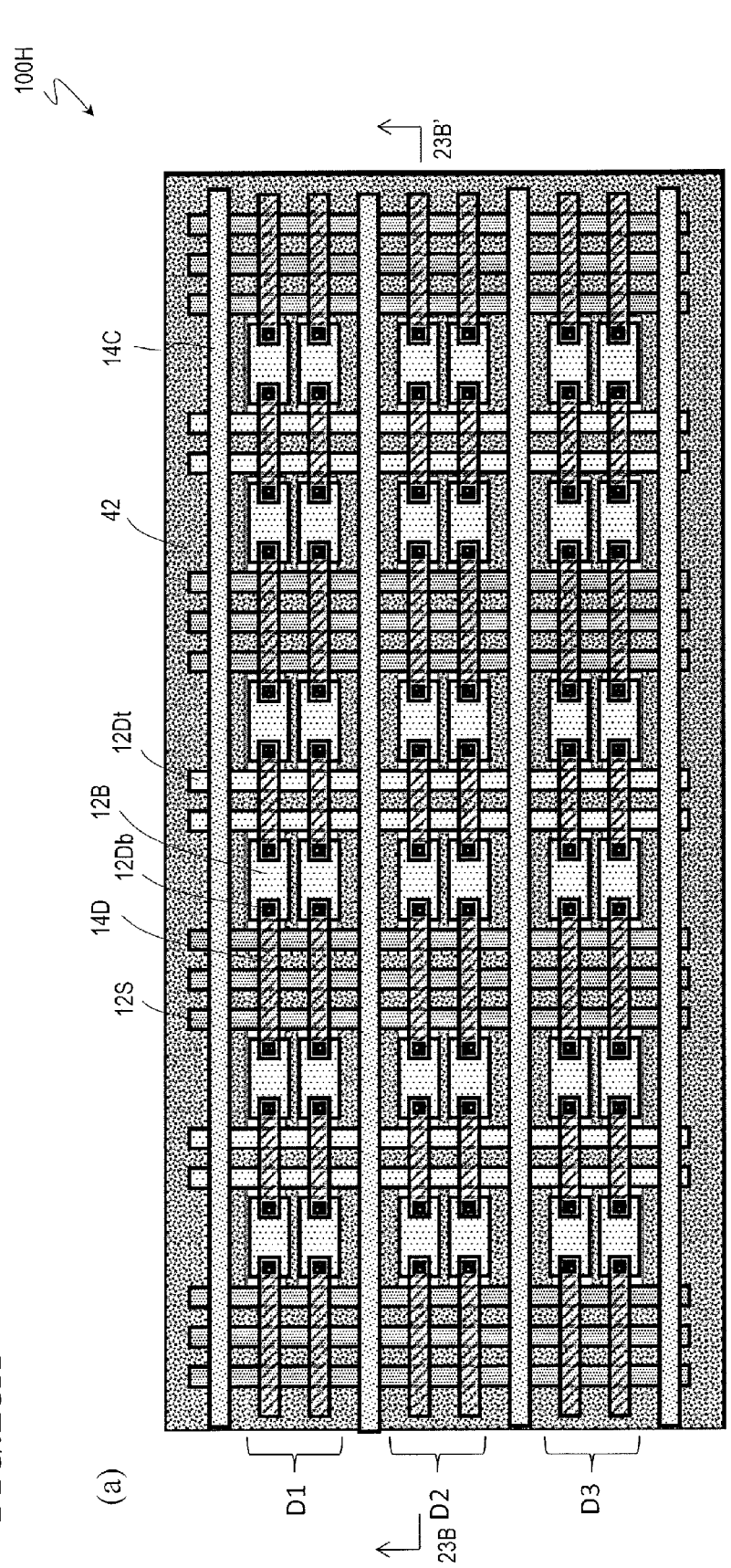
FIG. 23A (a) is a schematic plan view of a touchscreen panel 100H according to an embodiment of the present invention; and (b) is a schematic cross-sectional view taken along line 23B-23B' in (a).
Figure 23B:
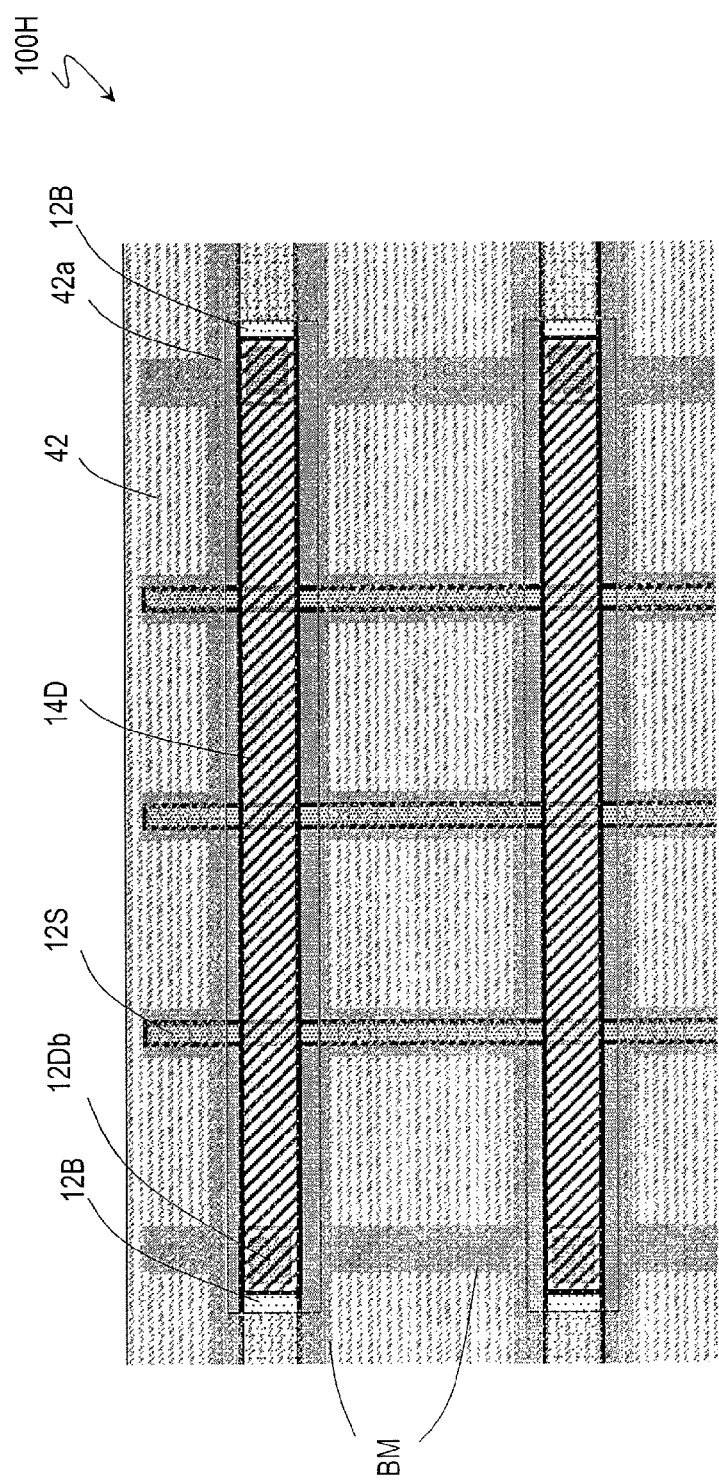
FIG. 23B A plan view showing enlarged a bridge structure for driving electrodes 14D of the touchscreen panel 100H.

FIGS. 23A(a) and (b) and FIG. 23B show a schematic structure of a touchscreen panel 100H according to an embodiment of the present invention. FIG. 23A(a) is a schematic plan view of the touchscreen panel 100H; FIG. 23A(b) is a schematic cross-sectional view taken along line 23B-23B' in FIG. 23A(a); and FIG. 23B is a plan view showing enlarged a bridge structure for the driving electrodes 14D. Although the touchscreen panel 100H has the multilayer structure (type A3) shown in FIG. 15(a), it can be easily modified into the multilayer structure (type A4) shown in FIG. 15(b).

In addition to the sensing electrodes 12S and the lead lines 12Dt, the first electrically conductive layer 12 of the touchscreen panel 100H includes bridge portions 12B for electrically connecting driving electrodes 14D to one another.

The second electrically conductive layer 14 of the touchscreen panel 100H includes driving electrodes 14D and auxiliary lines 14C extending in parallel to the driving electrodes 14D. The auxiliary lines 14C are in contact with the counter electrode 42, and contribute to low resistance of the counter electrode 42. The counter electrode 42 is composed of a transparent electrically conductive layer. FIG. 23A(a) shows three driving electrodes 14 that are independent from one another (D1 to D3).

The counter electrode 42 has apertures 42a, such that the driving electrodes 14D are formed in the apertures 42a. The driving electrodes 14D and the counter electrode 42 are electrically isolated from each other. Every two driving electrodes 14D adjacent to each other along the row direction are connected to each other via a bridge portion 12B which is made of the first electrically conductive layer 12. As shown in FIG. 23A(b), when forming the interlevel dielectric layer 22 covering the first electrically conductive layer 12, contact holes 22a for connecting the driving electrodes 14D to the bridge portions 12B of the first electrically conductive layer 12 are made, such that contact portions 12Db between the bridge portions 12B and the driving electrodes 14D are created in the contact holes 22a.

Note that, as shown in FIG. 23B, electrodes and wiring lines which are made of the first electrically conductive layer 12 or the second electrically conductive layer 14 are disposed so as to overlie a black matrix BM, and thus do not unfavorably affect displaying.

Next, with reference to FIG. 24 to FIG. 26, examples of interconnection between the lead lines 12Dt and the driving electrodes 14D will be described. In the following examples, the numbers of sensing electrodes 12S, driving electrodes 14D, and lead lines 12Dt are only exemplary; the illustrated numbers are not limiting.

Figure 24:
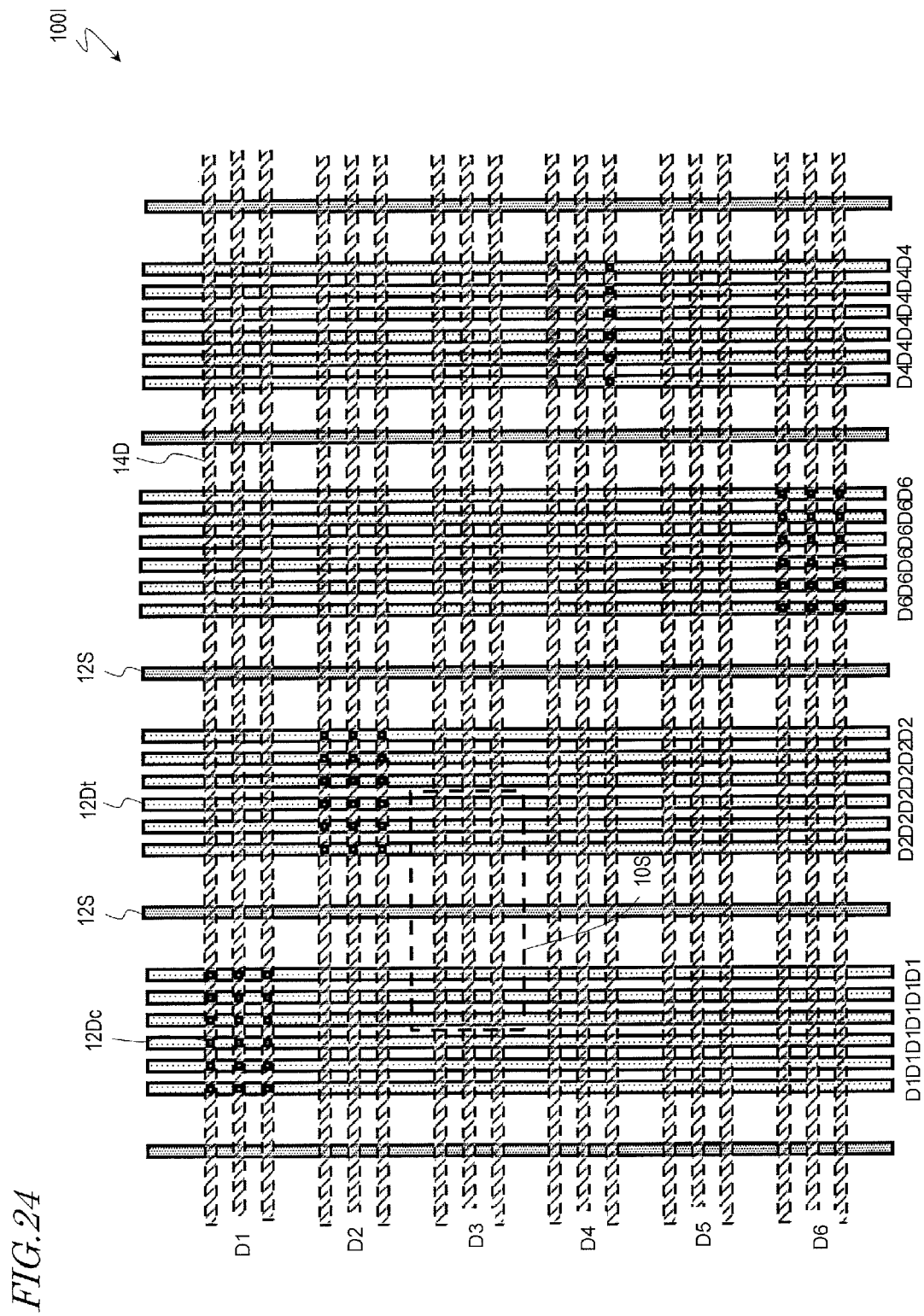
FIG. 24 A schematic plan view of a touchscreen panel 100I according to an embodiment of the present invention.

FIG. 24 shows a schematic plan view of a touchscreen panel 100I. In the touchscreen panel 100I, six lead lines 12Dt are provided between every two adjacent sensing electrodes 12S. Driving electrodes 14D are in sets of three; and D1 to D6 indicate there being six driving electrodes 14D that are electrically independent of one another. In the touchscreen panel 100I, the six lead lines 12Dt which are provided between the two adjacent sensing electrodes 12S are all connected to the same driving electrodes 14D (i.e., one of D1 to D6) via contact portions 12Dc. In other words, the six lead lines 12Dt which are provided between the two adjacent sensing electrodes 12S function as one lead line 12Dt, and are connected to one driving electrode 14D.

Figure 25:
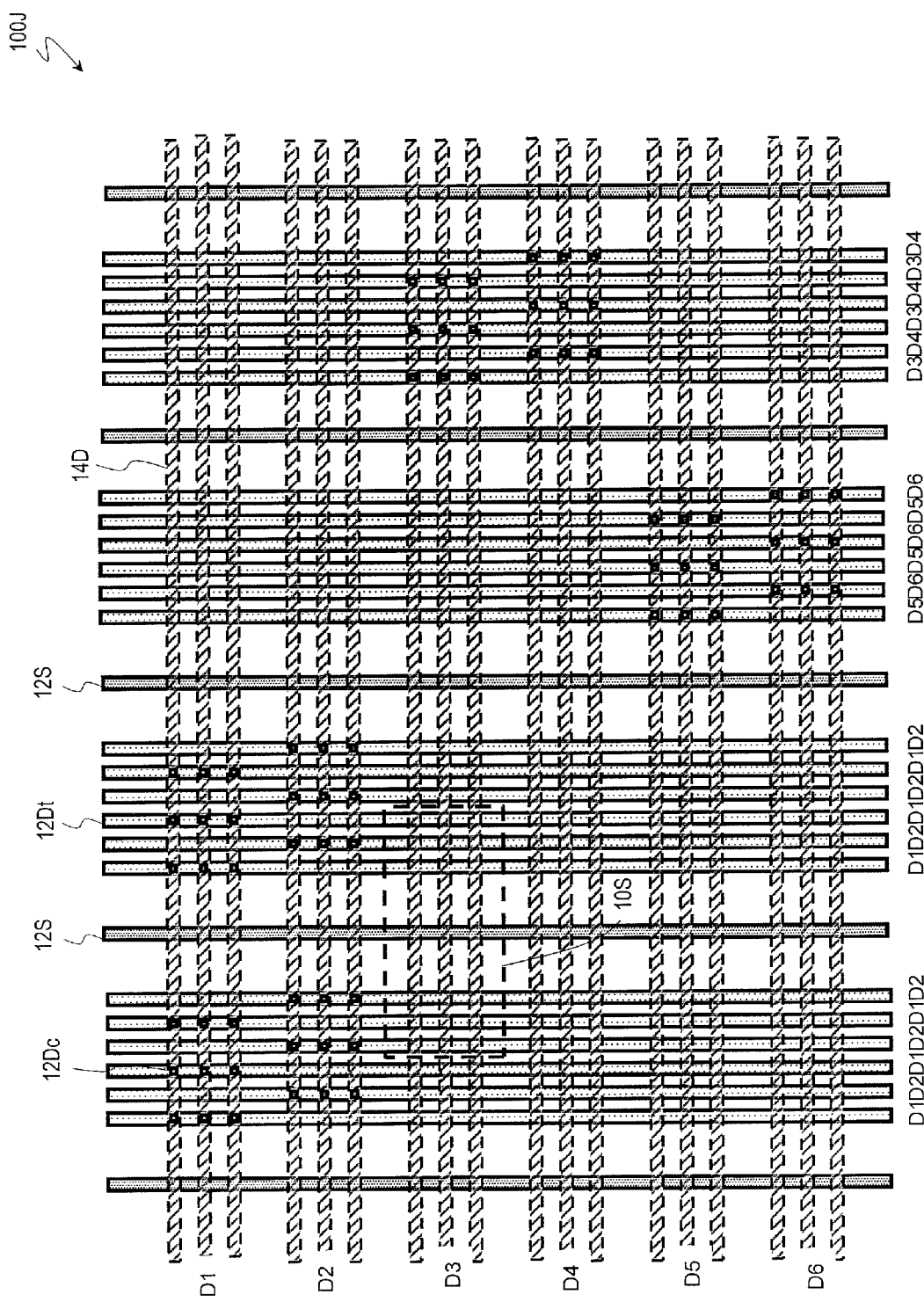
FIG. 25 A schematic plan view of a touchscreen panel 100J according to an embodiment of the present invention.

FIG. 25 shows a schematic plan view of a touchscreen panel 100J. In the touchscreen panel 100J, too, six lead lines 12Dt are provided between every two adjacent sensing electrodes 12S. Driving electrodes 14D are in sets of three; and D1 to D6 indicate there being six driving electrodes 14D that are electrically independent of one another. In the touchscreen panel 100J, the six lead lines 12Dt which are provided between the two adjacent sensing electrodes 12S are divided into threes, which are respectively connected to two driving electrodes 14D that are electrically independent of each other (e.g., D1 and D2) via contact portions 12Dc. Moreover, among the six lead lines 12Dt, lead lines 12Dt which are connected to two driving electrodes 14D that are electrically independent of each other (e.g., D1 and D2) are alternately positioned. Thus, by connecting the six lead lines 12Dt between the two adjacent sensing electrodes 12S to different driving electrodes 14D, the noise occurring in the sensing electrodes 12S can be reduced, as has been described above with reference to FIG. 6. Moreover, by allowing one driving electrode 14D to be connected to lead lines 12Dt at a number of different positions (the sensor portion(s) 10S, or the driving unit electrode(s) 14Da, 14Db), CR and/or fluctuations in the CR of the electrodes and wiring lines are reduced, as has been described with reference to FIGS. 3 to 5.

Note that the interconnection between the lead lines 12Dt and the driving electrodes 14D is not limited to the above example, and permits various modifications. It may be chosen as appropriate, in a manner of reducing CR and/or fluctuations in the CR of the electrodes and wiring lines.

Figure 26:
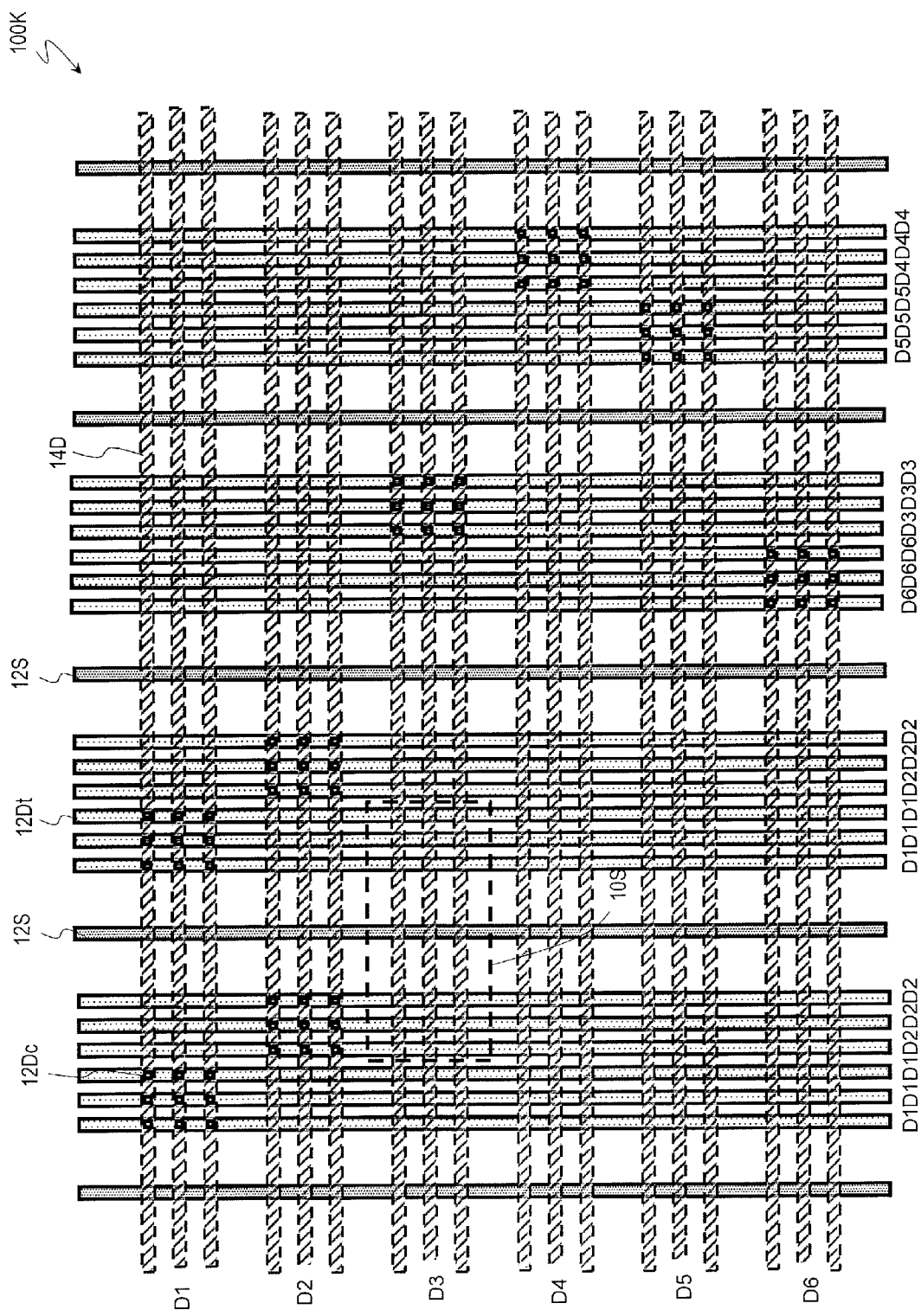
FIG. 26 A schematic plan view of a touchscreen panel 100K according to an embodiment of the present invention.

FIG. 26 shows a schematic plan view of a touchscreen panel 100K. In the touchscreen panel 100K, too, six lead lines 12Dt are provided between every two adjacent sensing electrodes 12S. Driving electrodes 14D are in sets of three; and D1 to D6 indicate there being six driving electrodes 14D that are electrically independent of one another. In the touchscreen panel 100K, the six lead lines 12Dt which are provided between the two adjacent sensing electrodes 12S are divided into threes, which are respectively connected to two driving electrodes 14D that are electrically independent of each other (e.g., D1 and D2) via contact portions 12Dc. Among the six lead lines 12Dt, lead lines 12Dt which are connected to two driving electrodes 14D that are electrically independent of each other (e.g., D1 and D2) are positioned in chunks of three. The touchscreen panel 100K can also exhibit similar effects to those of the touchscreen panel 100J.

Figure 27:
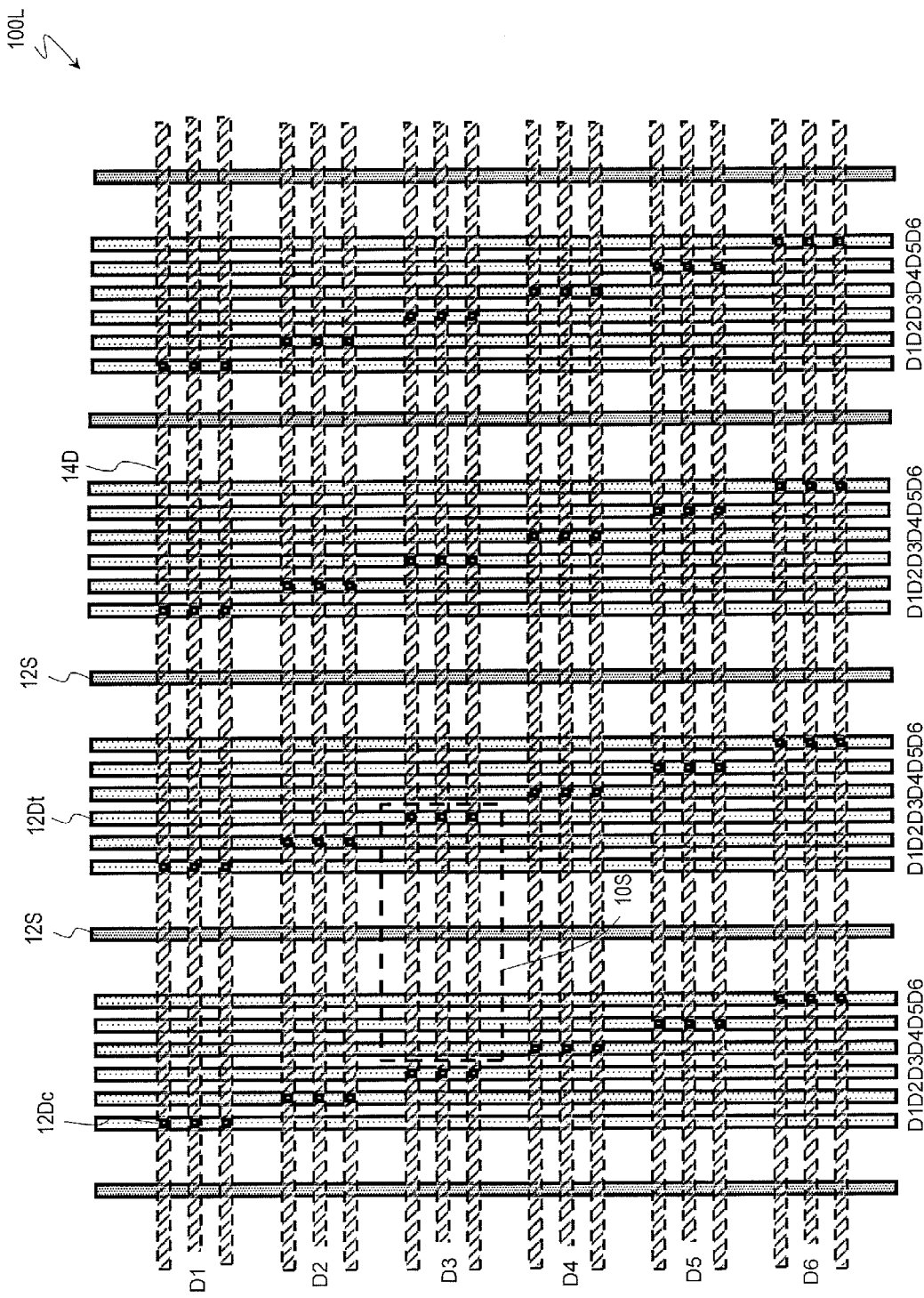
FIG. 27 A schematic plan view of a touchscreen panel 100L according to an embodiment of the present invention.

FIG. 27 shows a schematic plan view of a touchscreen panel 100L. In the touchscreen panel 100L, too, six lead lines 12Dt are provided between every two adjacent sensing electrodes 12S. Driving electrodes 14D are in sets of three; and D1 to D6 indicate there being six driving electrodes 14D that are electrically independent of one another. In the touchscreen panel 100L, the six lead lines 12Dt which are provided between the two adjacent sensing electrodes 12S are connected, respectively one-by-one, to six driving electrodes 14D that are electrically independent of one another (e.g., D1 to D6) via contact portions 12Dc. The touchscreen panel 100L is able to reduce the noise occurring in the sensing electrodes 12S further over the above touchscreen panel 100J or 100K. As has been described above with reference to FIG. 8, a parallel driving method may be adopted to further reduce the noise occurring in the sensing electrodes 12S.

Next, with reference to FIG. 28, an exemplary construction for a terminal region of a touchscreen panel 100M according to an embodiment of the present invention will be described.

Figure 28:
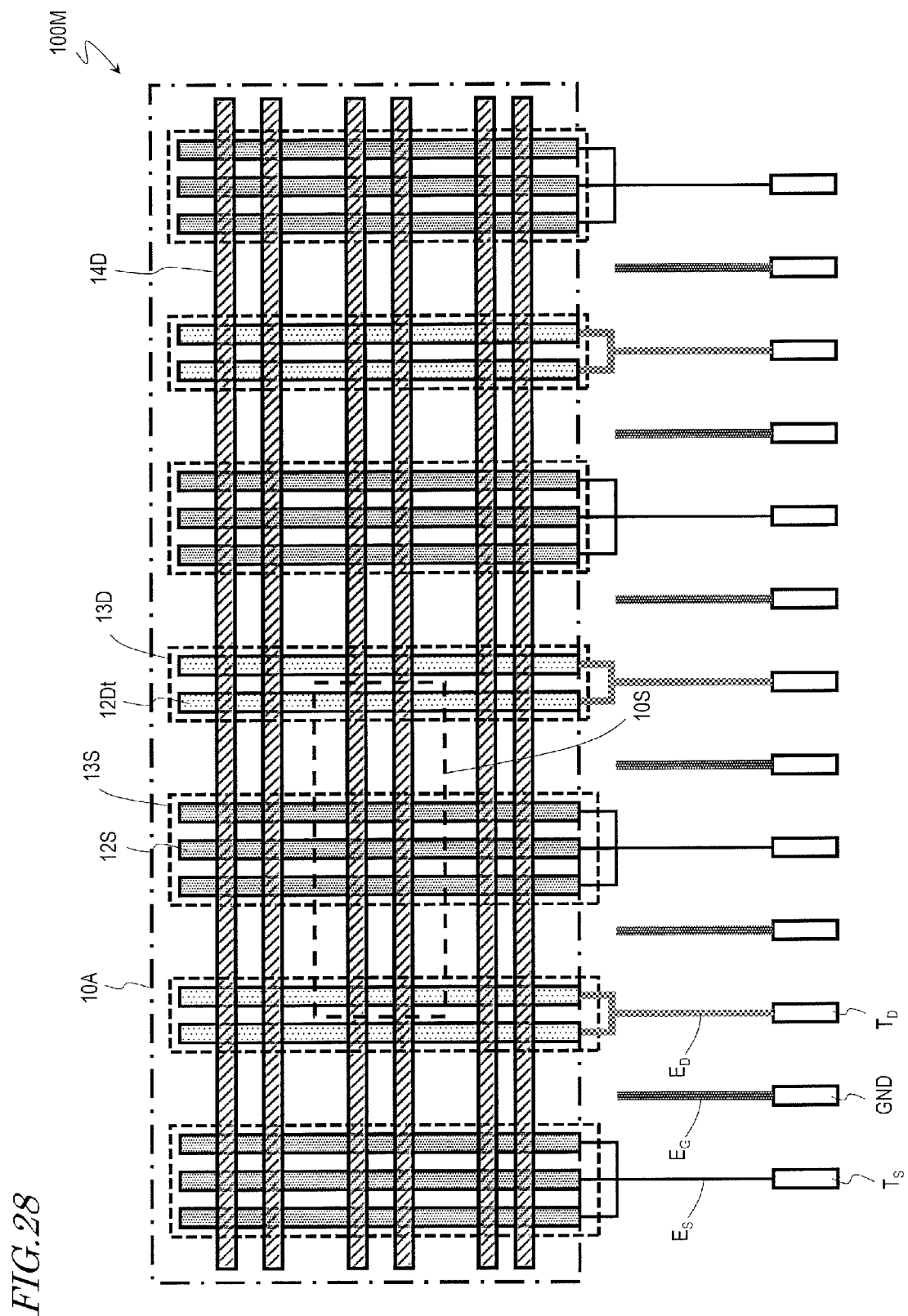
FIG. 28 A schematic plan view showing the construction of a terminal region of a touchscreen panel 100M according to an embodiment of the present invention.

As shown in FIG. 28, the sensing electrodes 12S are connected to sensing electrode terminals Ts via sensing electrode extension lines $E_S$, and the driving electrodes 14D are connected to driving electrode terminals $T_D$ via the lead lines 12Dt and driving electrode extension lines $E_D$. Thus, in the touchscreen panel 100M according to an embodiment of the present invention, the terminals $T_D$ of the wiring lines are disposed only in one peripheral region (terminal region) among the four peripheral regions that are above/below and to the right/left of the sensor array region 10A. Therefore, the touchscreen panel 100M provides an advantage of sufficiently reducing the widths of the three peripheral regions excluding the terminal region.

In the touchscreen panel 100M, ground extension lines $E_G$ and ground terminals GND are provided between: the sensing electrode extension lines $E_S$ and sensing electrode terminals Ts; and the driving electrode extension lines $E_D$ and driving electrode terminals $T_D$. Preferably, the sensing electrode extension lines $E_S$, the driving electrode extension lines $E_D$, and the ground extension lines $E_G$ have a resistance of 100Ω or less. Thus, by allowing the ground extension lines $E_G$ to be disposed between the sensing electrode extension lines $E_S$ and the driving electrode extension lines $E_D$, the values of coupling capacitance between the driving electrode extension lines $E_D$ and the sensing electrode extension lines $E_S$ are reduced, whereby noise occurrence is suppressed.

Figure 29:
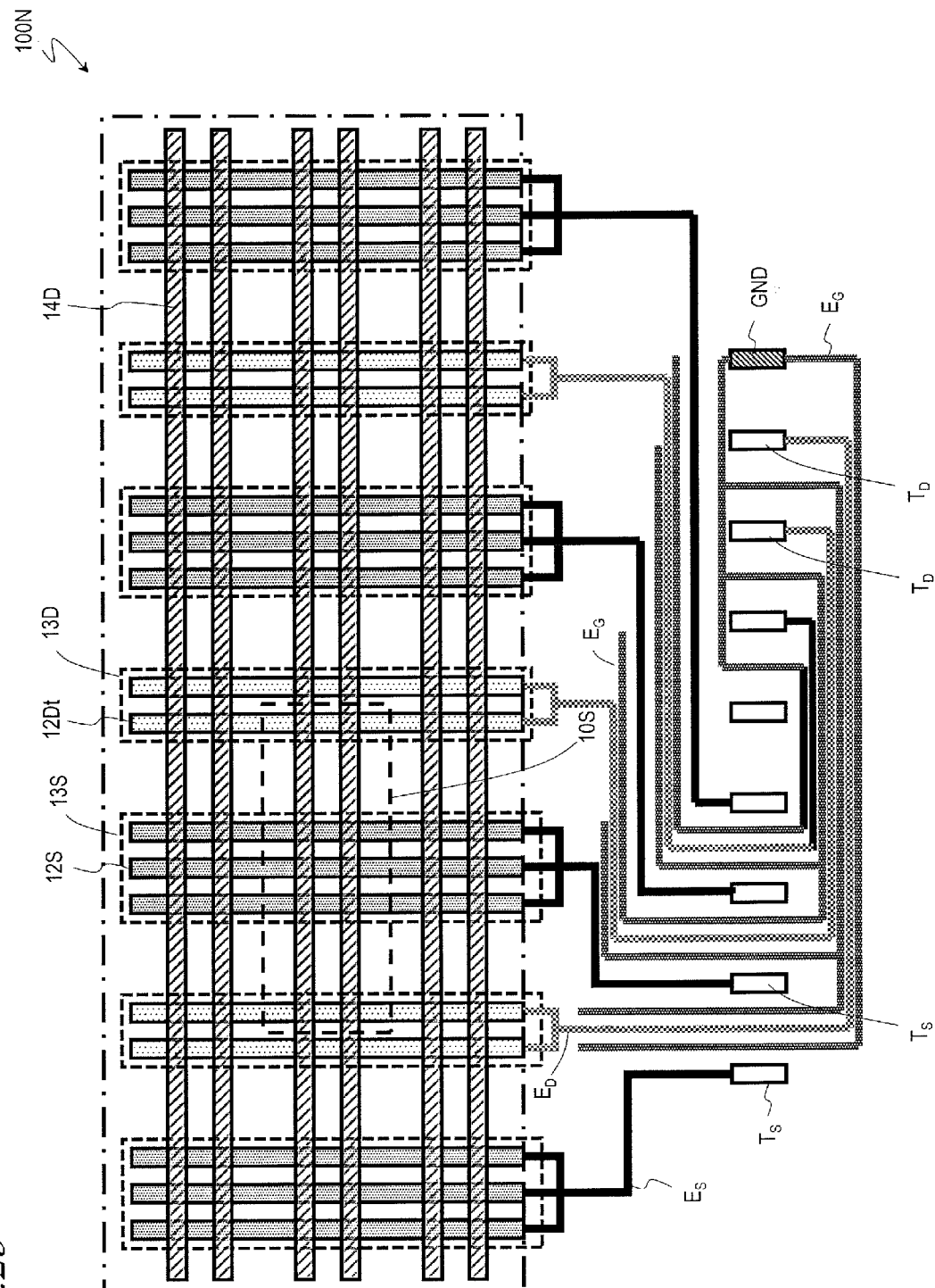
FIG. 29 A schematic plan view showing the construction of a terminal region of a touchscreen panel 100N according to an embodiment of the present invention.

Furthermore, as in a touchscreen panel 100N shown in FIG. 29, in the case where there is only one ground terminal GND in order to reduce the total number of terminals, branched and elongated forms of ground extension lines $E_G$ may be used, such that the ground extension lines $E_G$ are disposed between the sensing electrode extension lines $E_S$ and the driving electrode extension lines $E_D$. As a result, the values of coupling capacitance between the driving electrode extension lines $E_D$ and the sensing electrode extension lines $E_S$ are reduced, whereby noise occurrence is suppressed.

As described above, a touchscreen panel according to an embodiment of the present invention has an advantage in that, among four peripheral regions that are above/below and to the right/left of the sensor array region, three peripheral regions except for the one peripheral region to which terminals of the wiring lines are to be led out are sufficiently reduced in width. Therefore, it can be combined with display devices having a display panel whose frame (peripheral displaying region) is unlikely to be visually recognized, as are disclosed in International Publication No. 2010/092794 and International Publication No. 2010/122781 by the Applicant, for example. The entire disclosure of each of these International Publications is incorporated herein by reference. The display devices which are disclosed in these International Publications include a light-transmitting cover disposed on the side from which the display panel is to be viewed, the light-transmitting cover including a lens portion which is disposed in a position overlying a region containing a portion of the frame region of the display panel and a portion of the peripheral displaying region adjacent to the frame region. Since light going out from that portion of the peripheral displaying region is led by the lens portion to the viewer's side of the frame region, the frame region becomes less likely to be visually recognized. In this context, preferably, a touchscreen panel according to an embodiment of the present invention is disposed between the display panel and the light-transmitting cover. In the case where the light-transmitting cover is made of an acrylic resin, for example, the thickness of the light-transmitting cover may be approximately 3 mm or less, whereby adequate touch sensor operation is achieved even if the touchscreen panel is disposed between the display panel and the light-transmitting cover.

The present specification discloses touchscreen panels as described in the following Items.

[Item 1]

A touchscreen panel comprising:

a transparent substrate;

a first electrically conductive layer supported on the transparent substrate, the first electrically conductive layer including a plurality of sensing electrodes extending along a first direction; and a second electrically conductive layer including a plurality of driving electrodes extending along a second direction intersecting the first direction, the plurality of driving electrodes being electrically insulated from the plurality of sensing electrodes, wherein, the plurality of sensing electrodes and the plurality of driving electrodes define a sensor array region, the sensor array region including a plurality of sensor portions arranged in a matrix array;

the first electrically conductive layer further includes a plurality of lead lines extending essentially in parallel to the first direction within the sensor array region; and each of the plurality of driving electrodes is connected to at least one of the plurality of lead lines, and terminals of the plurality of sensing electrodes and terminals of the plurality of lead lines are both provided in a neighborhood of a same edge of the transparent substrate that extends essentially in parallel to the second direction.

Among four peripheral regions that are above/below and to the right/left of the sensor array region, the touchscreen panel described in Item 1 sufficiently reduces the widths of three peripheral regions except for the one peripheral region to which terminals of the wiring lines are to be led out.

[Item 2]

The touchscreen panel of Item 1, further comprising an interlevel dielectric layer formed between the first electrically conductive layer and the second electrically conductive layer.

[Item 3]

The touchscreen panel of Item 2, further comprising a transparent electrically conductive layer formed between the first electrically conductive layer and the interlevel dielectric layer.

The touchscreen panel described in Item 3 is able to reduce resistances of electrodes and the like to be composed of the first electrically conductive layer. Also, a decrease in transmittance caused by them is reduced.

[Item 4]

The touchscreen panel of Item 2, further comprising a transparent electrically conductive layer formed between the second electrically conductive layer and the interlevel dielectric layer.

The touchscreen panel described in Item 4 is able to reduce resistances of electrodes and the like to be composed of the second electrically conductive layer. Also, a decrease in transmittance caused by them is reduced.

[Item 5]

The touchscreen panel of Item 1, further comprising a polymer layer between the first electrically conductive layer and the second electrically conductive layer, the polymer layer having electrically conductive regions and a non-electrically conductive region, the polymer layer being in contact with the plurality of sensing electrodes in the non-electrically conductive region and being in contact with the plurality of driving electrodes in the electrically conductive regions.

In the touchscreen panel described in Item 5, the electrically conductive regions of the polymer layer are allowed to function as contact portions, and the non-electrically conductive region of the polymer layer are allowed to function as an interlevel dielectric layer.

[Item 6]

The touchscreen panel of any of Items 1 to 5, further comprising a dielectric layer formed on the second electrically conductive layer.

[Item 7]

The touchscreen panel of any of Items 1 to 6, wherein the plurality of driving electrodes include a driving electrode which is electrically connected to the plurality of lead lines at two sensor portions.

In the touchscreen panel described in Item 7, CR and/or fluctuations in the CR of the electrodes and wiring lines are reduced.

[Item 8]

The touchscreen panel of Item 7, wherein a position at which a distance between the two sensor portions is bisected is a position at which a length of the plurality of driving electrodes along the second direction is essentially bisected, and distances between a center of the plurality of driving electrodes along the second direction and the two sensor portions are equal to about ⅓ of the length of the plurality of driving electrodes along the second direction.

[Item 9]

The touchscreen panel of any of Items 1 to 8, wherein,
the plurality of driving electrodes include a driving electrode which is electrically connected to the plurality of lead lines at only one sensor portion; and
the position of the only one sensor portion is a position at which a length of the plurality of driving electrodes along the second direction is essentially bisected.

[Item 10]

The touchscreen panel of any of Items 1 to 6, wherein each of the plurality of driving electrodes is electrically connected to two or more lead lines among the plurality of lead lines.

In the touchscreen panel described in Item 10, CR and/or fluctuations in the CR of the electrodes and wiring lines are reduced.

[Item 11]

The touchscreen panel of Item 10, wherein transmission signals which are supplied to the two or more lead lines electrically connected to each of the plurality of driving electrodes take a HIGH state at different points in time.

In the touchscreen panel described in Item 11, noise that is induced in the sensing electrodes can be reduced.

[Item 12]

The touchscreen panel of Item 10, wherein transmission signals which are supplied to the two or more lead lines electrically connected to each of the plurality of driving electrodes simultaneously take a HIGH state plural times.

In the touchscreen panel described in Item 12, noise that is induced in the sensing electrodes can be reduced.

[Item 13]

The touchscreen panel of any of Items 1 to 12, wherein the plurality of driving electrodes reach an edge of the transparent substrate that is parallel to the first direction.

In the touchscreen panel described in Item 13, non-sensitive regions to be created on the right and left of the sensor array region can be narrowed.

[Item 14]

The touchscreen panel of any of Items 1 to 13, further comprising a display cell including a TFT substrate, a counter substrate, and a display medium layer provided between the TFT substrate and the counter substrate, wherein
the transparent substrate doubles as the counter substrate.

The touchscreen panel described in Item 14 is an IN-cell type.

[Item 15]

The touchscreen panel of any of Items 1 to 13, further comprising a display cell including a TFT substrate, a counter substrate, and a display medium layer provided between the TFT substrate and the counter substrate, wherein
the second electrically conductive layer of the transparent substrate is disposed on a side of the counter substrate facing away from the display medium layer.

The touchscreen panel described in Item 15 is an ON-cell type.

[Item 16]

The touchscreen panel of Item 14 or 15, wherein the counter substrate further includes a counter electrode for applying a voltage across the display medium layer.

The touchscreen panel described in Item 16 may include a display cell, such as a liquid crystal display cell of a vertical field mode (e.g., VA or TN mode).

INDUSTRIAL APPLICABILITY

A touchscreen panel according to the present invention is able to be combined with various display panels.

REFERENCE SIGNS LIST 10A sensor array region
10S sensor portion
12 first electrically conductive layer
12Dc contact portion
12Dt lead line
12S sensing electrode
12Sa, 12Sb sensing unit electrode
12St sensing line
13 transparent electrically conductive layer
14 second electrically conductive layer
14D driving electrode 14Da, 14Db driving unit electrode
22 interlevel dielectric layer
24 dielectric layer
25 counter substrate (glass substrate)
27 display medium layer (liquid crystal layer)
28 TFT substrate
32 polymer layer
32a electrically conductive region
32b non-electrically conductive region
42 counter electrode (transparent electrode)
100 touchscreen panel

The invention claimed is:

1. A touchscreen panel comprising:
a transparent substrate;
a first electrically conductive layer supported on the transparent substrate, the first electrically conductive layer including a plurality of sensing electrodes extending along a first direction; and
a second electrically conductive layer including a plurality of driving electrodes extending along a second direction intersecting the first direction, the plurality of driving electrodes being electrically insulated from the plurality of sensing electrodes, wherein,
the plurality of sensing electrodes and the plurality of driving electrodes define a sensor array region, the sensor array region including a plurality of sensor portions arranged in a matrix array;
the first electrically conductive layer further includes a plurality of lead lines extending essentially in parallel to the first direction within the sensor array region;
each of the plurality of driving electrodes is connected to at least one of the plurality of lead lines, and terminals of the plurality of sensing electrodes and terminals of the plurality of lead lines are both provided in a neighborhood of a same edge of the transparent substrate that extends essentially in parallel to the second direction;
the plurality of driving electrodes include a first driving electrode which is electrically connected to at least two of the plurality of lead lines at two sensor portions; and
a position at which a distance between the two sensor portions is bisected is a position at which a length of the first driving electrode along the second direction is essentially bisected, and distances between a center of the first driving electrode along the second direction and the two sensor portions are equal to about ⅓ of the length of the first driving electrode along the second direction.

2. The touchscreen panel of claim 1, further comprising an interlevel dielectric layer formed between the first electrically conductive layer and the second electrically conductive layer.

3. The touchscreen panel of claim 2, further comprising a transparent electrically conductive layer formed between the first electrically conductive layer and the interlevel dielectric layer.

4. The touchscreen panel of claim 2, further comprising a transparent electrically conductive layer formed between the second electrically conductive layer and the interlevel dielectric layer.

5. The touchscreen panel of claim 1, further comprising a polymer layer between the first electrically conductive layer and the second electrically conductive layer, the polymer layer having electrically conductive regions and a non-electrically conductive region, the polymer layer being in contact with the plurality of sensing electrodes in the non-electrically conductive region and being in contact with the plurality of driving electrodes in the electrically conductive regions.

6. The touchscreen panel of claim 1, further comprising a dielectric layer formed on the second electrically conductive layer.

7. The touchscreen panel of claim 1, wherein,
the plurality of driving electrodes include a second driving electrode which is electrically connected to at least one of the plurality of lead lines at only one sensor portion; and
the position of the only one sensor portion is a position at which a length of the second driving electrode along the second direction is essentially bisected.

8. The touchscreen panel of claim 1, wherein the plurality of driving electrodes reach an edge of the transparent substrate that is parallel to the first direction.

9. The touchscreen panel of claim 1, further comprising a display cell including a TFT substrate, a counter substrate, and a display medium layer provided between the TFT substrate and the counter substrate, wherein
the transparent substrate doubles as the counter substrate.

10. The touchscreen panel of claim 9, wherein the counter substrate further includes a counter electrode for applying a voltage across the display medium layer.

11. The touchscreen panel of claim 1, further comprising a display cell including a TFT substrate, a counter substrate, and a display medium layer provided between the TFT substrate and the counter substrate, wherein
the second electrically conductive layer of the transparent substrate is disposed on a side of the counter substrate facing away from the display medium layer.

* * * * *